US012683502B2

(12) United States Patent
Watanabe

(10) Patent No.: US 12,683,502 B2
(45) Date of Patent: Jul. 14, 2026

(54) SEMICONDUCTOR DEVICE, SEMICONDUCTOR SYSTEM AND SWITCHING POWER DEVICE

(71) Applicant: ROHM CO., LTD., Kyoto (JP)

(72) Inventor: Yukihiro Watanabe, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 186 days.

(21) Appl. No.: 18/777,716

(22) Filed: Jul. 19, 2024

(65) Prior Publication Data

US 2025/0038669 A1 Jan. 30, 2025

(30) Foreign Application Priority Data

Jul. 24, 2023 (JP) ................................. 2023-119846

(51) Int. Cl.
*H02M 3/158* (2006.01)
(52) U.S. Cl.
CPC ........ *H02M 3/1584* (2013.01); *H02M 3/1586* (2021.05); *H02M 3/1588* (2013.01)
(58) Field of Classification Search
CPC . H02M 3/1584; H02M 3/1586; H02M 3/1588
See application file for complete search history.

(56) References Cited

U.S. PATENT DOCUMENTS

2007/0046273 A1* 3/2007 Riehl .................... H02M 3/156
 323/282
2011/0260765 A1* 10/2011 Chen ........................ H03K 7/08
 327/202
2016/0370816 A1* 12/2016 Wei ............................ G05F 1/56
2020/0169174 A1* 5/2020 Wachi ................... H02M 1/088

FOREIGN PATENT DOCUMENTS

JP 2022-006829 1/2022

* cited by examiner

*Primary Examiner* — Jue Zhang
(74) *Attorney, Agent, or Firm* — Fish & Richardson P.C.

(57) ABSTRACT

The present disclosure provides a semiconductor device, including: a synchronous input terminal; a synchronous output terminal; a functional circuit, having a reference clock signal generating circuit operable to generate a reference clock signal; a signal output circuit, connected to the synchronous output terminal; and a mode setting circuit, for setting an operation mode of the functional circuit and the signal output circuit to a first mode or a second mode through a mode determination process. The functional circuit is operable to perform a predetermined functional operation in synchronization with the reference clock signal in the first mode, and perform the functional operation in synchronization with an input clock signal transmitted to the synchronous input terminal from another semiconductor device in the second mode. The signal output circuit is operable to output a clock signal based on the reference clock signal from the synchronous output terminal in the first mode.

12 Claims, 18 Drawing Sheets

STP1   A supply of the input voltage Vin starts

STP2   Perform an initial setting process including a mode determination process during an initial setting period STP3   Perform a normal operation during a normal operation period

[Between T1 and T3]

SEMICONDUCTOR DEVICE, SEMICONDUCTOR SYSTEM AND SWITCHING POWER DEVICE

CROSS-REFERENCE TO RELATED APPLICATION

This application claims priority under 35 U.S.C. 119 to Japanese Application No. 2023-119846, filed on Jul. 24, 2023, the entirety of which is incorporated herein by reference.

TECHNICAL FIELD

The present disclosure relates to a semiconductor device, a semiconductor system and a switching power device.

BACKGROUND

A configuration to achieve synchronization among multiple semiconductor devices is sometimes adopted. For example, there is known a method for forming a multi-phase DC (Direct Current)/DC converter by means of synchronizing a multi-channel DC/DC converter (for example, with reference to patent document 1 below). [Patent document 1] Japan Patent Publication No. 2022-6829

DETAILED DESCRIPTION OF THE EMBODIMENTS

Figure 1:
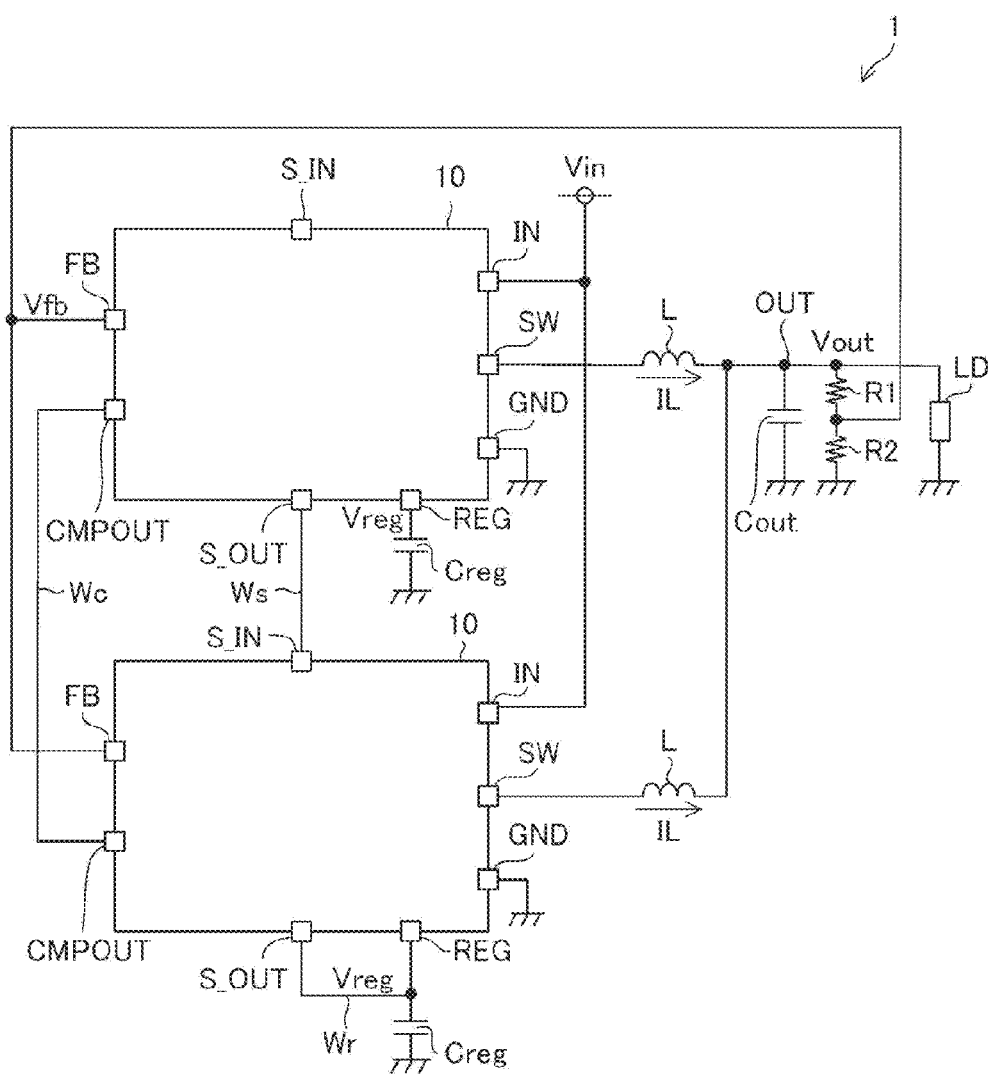
FIG. 1 is an overall configuration diagram of a switching power device according to an embodiment of the present disclosure.

Details of examples of the embodiments of the present disclosure are given with the accompanying drawings below. In the drawings for reference, the same parts are denoted by the same numerals or symbols, and repeated description related to the same parts is in principle omitted. Moreover, in the present application, in order to keep the description simple, by means of indications in numerals or symbols to represent information, signals, physical quantities, functional units, circuits, elements or parts, names of the information, signals, physical quantities, functional units, circuits, elements or parts corresponding to the numerals or symbols are sometimes omitted or abbreviated.

Some terms used in the description of the embodiments of the present disclosure are first explained below. The term "ground" refers to a reference conductive unit acting as a reference voltage of 0 V potential or the 0 V potential itself. The reference conductive unit may be a conductor formed of such as metal. The 0 V potential is sometimes referred to as ground potential. In the embodiments of the present disclosure, a voltage expressed without a specifically set reference represents a potential with respect to ground.

For any concerned signal or voltage, a level refers to the level of a potential, and a high level has a potential higher than that of a low level. For any concerned signal, an inverted signal of the signal has a low level when the signal has a high level, and an inverted signal of the signal has a high level when the signal has a low level.

For any concerned signal or voltage, switching from a low level to a high level is referred to as a rising edge, and switching from a high level to a low level is referred to as a falling edge.

For any transistor configured as a field-effect transistor (FET) such a metal-oxide-semiconductor field-effect transistor (MOSFET), an on state refers to a state of conduction between the drain and the source of the transistor, and an off state refers to a state of non-conduction (a state of disconnection) between the drain and the source of the transistor. The same applies to those categorized as non-FET transistors. Unless otherwise specified, a MOSFET is considered an enhanced MOSFET. The term MOSFET is an abbreviation of metal-oxide-semiconductor field-effect transistor. Moreover, unless otherwise specified, in any MOSFET, it is considered that the back gate is shorted with the source.

In the description below, for any transistor, the on state and the off state may also be expressed simply as on and off. For any transistor, switching from an off state to an on state is expressed as turning on, and switching from an on state to an off state is expressed as turning off. Moreover, for any transistor, a period in which the transistor becomes in an on state is referred to an on-period, and a period in which the transistor becomes in an off state is referred to as an off-period.

For any signal having a high signal level or a low signal level, a period in which the level of the signal becomes a high level is referred to as a high level period, and a period in which the level of the signal becomes a low level is referred to as a low level period. The same applies to any voltage of which the voltage level has a high level or a low level.

A connection formed between multiple parts of a circuit, such as circuit elements, wires and nodes that form a circuit, can be understood as an electrical connection unless otherwise specified.

FIG. 1 shows an overall configuration of a switching power device 1 according to an embodiment of the present disclosure. The switching power device 1 receives a supply of a positive input voltage Vin from a voltage source (not shown), and generates a positive output voltage Vout by stepping down the input voltage Vin. Thus, the output voltage Vout is lower than the input voltage Vin. The switching power device 1 stabilizes the output voltage Vout to a predetermined target voltage. That is, in a stable state, the output voltage Vout and the target voltage are substantially consistent. The denotation "Vtg" is used to represent the target voltage hereinafter. The switching power device 1 includes two power supply control devices 10. Wirings disposed external to the two power supply control devices 10 can be specifically referred to as external wirings.

The switching power device 1 can be, for example, mounted in a vehicle such as an automobile. In this case, the input voltage Vin can be an output voltage of a battery mounted in the vehicle. Moreover, the switching power device 1 can be disposed in any machine (for example, a smartphone, a portable information terminal, a computer device, a gaming machine, a television or an air-conditioner).

Figure 2:
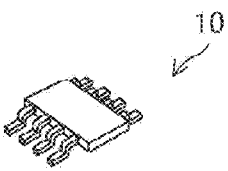
FIG. 2 is a perspective diagram of the appearance of a switching power device according to an embodiment of the present disclosure.

FIG. 2 shows a perspective diagram of the appearance of one power supply control device 10. The power supply control device 10 is an electronic component (a semiconductor device) including the following parts: a semiconductor chip, having a semiconductor integrated circuit formed on a semiconductor substrate; a housing (a package), accommodating the semiconductor chip; and multiple external terminals, exposed to an exterior of the power supply control device 10 from the housing. The power supply control device 10 is formed by packaging the semiconductor chip in the housing (package) formed of resin. Moreover, the number of external terminals of the power supply control device 10 and the type of the housing of the power supply control device 10 shown in FIG. 2 are merely examples, and can be designed as desired. The multiple external terminals provided at the power supply control device 10 include an input terminal IN, a switching terminal SW, a ground terminal GND, a feedback terminal FB, an error sharing terminal CMPOUT, a synchronous input terminal S_IN, a synchronous output terminal S_OUT and an internal power supply output terminal REG. External terminals other than those terminals above can also be provided at the power supply control device 10. Moreover, the synchronous input terminal can be replaced by a synchronous clock input terminal, and the synchronous output terminal can be replaced by a synchronous clock output terminal.

The switching power device 1 includes a coil L for each power supply control device 10. The coil L is disposed external to the power supply control device 10. A first end of the coil L paired with a certain power supply control device 10 is connected to the switching terminal SW with respect to the power supply control device 10. Second ends of both coils L are commonly connected to the output terminal OUT. In each coil L, a current flowing to the coil L is referred to as a coil current IL. The coil current IL in principle flows from the switching terminal SW to the output terminal OUT (only such principle is considered in the description below).

The switching power device 1 is further provided therein with an output capacitor Cout and feedback resistors R1 and R2. The output capacitor Cout is placed between the output terminal OUT and ground. That is, a first end of the output capacitor Cout is connected to the output terminal OUT, and a second end of the output capacitor Cout is grounded. A voltage in the output terminal OUT is the output voltage Vout. That is, the output terminal OUT is an application end of the output voltage Vout. A load LD is connected to the output terminal OUT. The load LD is any load driven based on the output voltage Vout.

A first end of the feedback resistor R1 is connected to the output terminal OUT, a second end of the feedback resistor R1 is connected to a first end of the feedback resistor R2, and a second end of the feedback resistor R2 is grounded. A connection node between the feedback resistors R1 and R2 generates a feedback voltage Vfb corresponding to the output voltage Vout. The feedback voltage Vfb is a voltage divided from the output voltage Vout, and is thus directly proportional to the output voltage Vout. The feedback resistors R1 and R2 form a feedback voltage generating circuit that generates the feedback voltage Vfb. The feedback terminal FB of each power supply control device 10 is connected to a connection node between the feedback resistors R1 and R2, and receives the feedback voltage Vfb. Moreover, the output voltage Vout itself can also be the feedback voltage Vfb. In all cases, the feedback voltage Vfb is a voltage corresponding to the output voltage Vout.

The two power supply control devices 10 can be referred to as first and second power supply control devices 10. Between the first and second power supply control devices 10, the first power supply control device 10 operates in a first mode (a reading mode), and the second power supply control device 10 operates in a second mode (a tracking mode), with associated details to be described below. Alternatively, the feedback voltage Vfb can be provided to only the feedback terminal FB of the first power supply control device 10 operating in the first mode.

The input voltage Vin is supplied to the input terminal IN of each power supply control device 10. The ground terminal GND of each power supply control device 10 is grounded. Two error sharing terminals CMPOUT in the two power supply control devices 10 are connected to each other by an external wiring Wc. The synchronous output terminal S_OUT of the first power supply control device 10 and the synchronous input terminal S_IN of the second power supply control device 10 are connected to each other by an external wiring Ws.

Each power supply control device 10 includes an internal power supply circuit (an internal power supply circuit 80 below, see FIG. 4) which generates an internal power supply voltage Vreg based on the input voltage Vin, and the internal power supply voltage Vreg generated is output from the internal power supply output terminal REG. On the exterior of the power supply control devices 10, a capacitor Creg is provided for each power supply control device 10. The capacitor Creg of each power supply control device 10 is placed between the internal power supply output terminal REG and ground.

A group formed by one power supply control device 10 and one coil L cooperates with the output capacitor Cout, further forming a DC/DC converter of one channel performing current mode control. Thus, DC/DC converters with two channels are formed in the switching power device 1. The output capacitor Cout is shared by the DC/DC converters of the two channels. However, the output capacitor Cout can also be provided for each channel. In the switching power device 1, a signal (an error signal below) corresponding to the feedback voltage Vfb can be shared by the power supply control devices 10 of both/all channels, so that switching phases are staggered among multiple channels to implement multi-phase control.

Figure 3:
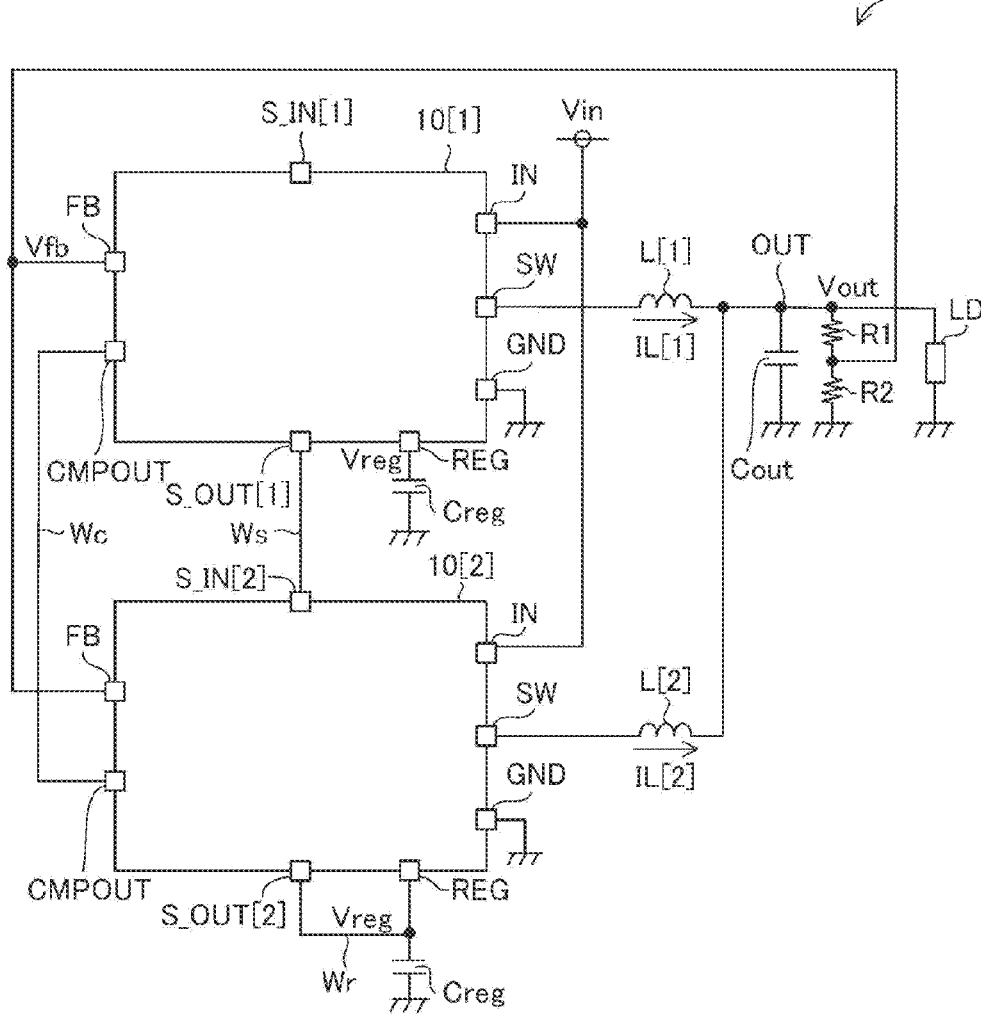
FIG. 3 is an overall configuration diagram of a switching power device according to an embodiment of the present disclosure.

In the description below, in order to clearly distinguish requirements of the first and second power supply control devices 10, as shown in FIG. 3, sometimes the first power supply control device 10 is represented by a numeral "10[1]" and sometimes the second power supply control device 10 is represented by a numeral "10[2]". Moreover, the coils L paired with the power supply control devices 10[1] and 10[2] are respectively referred to as coils L[1] and L[2]. That is, the switching terminal SW of the power supply control device 10[i] is connected to the first end of the coil L[i], and the second end of the coil L[i] is connected to the output terminal OUT. The coil current IL flowing to the coil L[i] can be specifically referred to as a coil current IL[i], where i represents any integer.

Moreover, the synchronous input terminal S_IN and the synchronous output terminal S_OUT in the power supply control device 10[i] can be specifically referred to as a synchronous input terminal S_IN[i] and a synchronous output terminal S_OUT[i], respectively. In the switching power device 1, the synchronous input terminal S_IN[1] is open. The synchronous input terminal S_IN[1] can also be grounded. In the switching power device 1, the synchronous output terminal S_OUT[1] is connected to the synchronous input terminal S_IN[2] by the external wiring Ws. In the switching power device 1, the synchronous output terminal S_OUT[2] is connected to the internal power supply output terminal REG of the power supply control device 10[2] by the external wiring Wr, so as to receive a supply of the internal power supply voltage Vreg.

Figure 4:
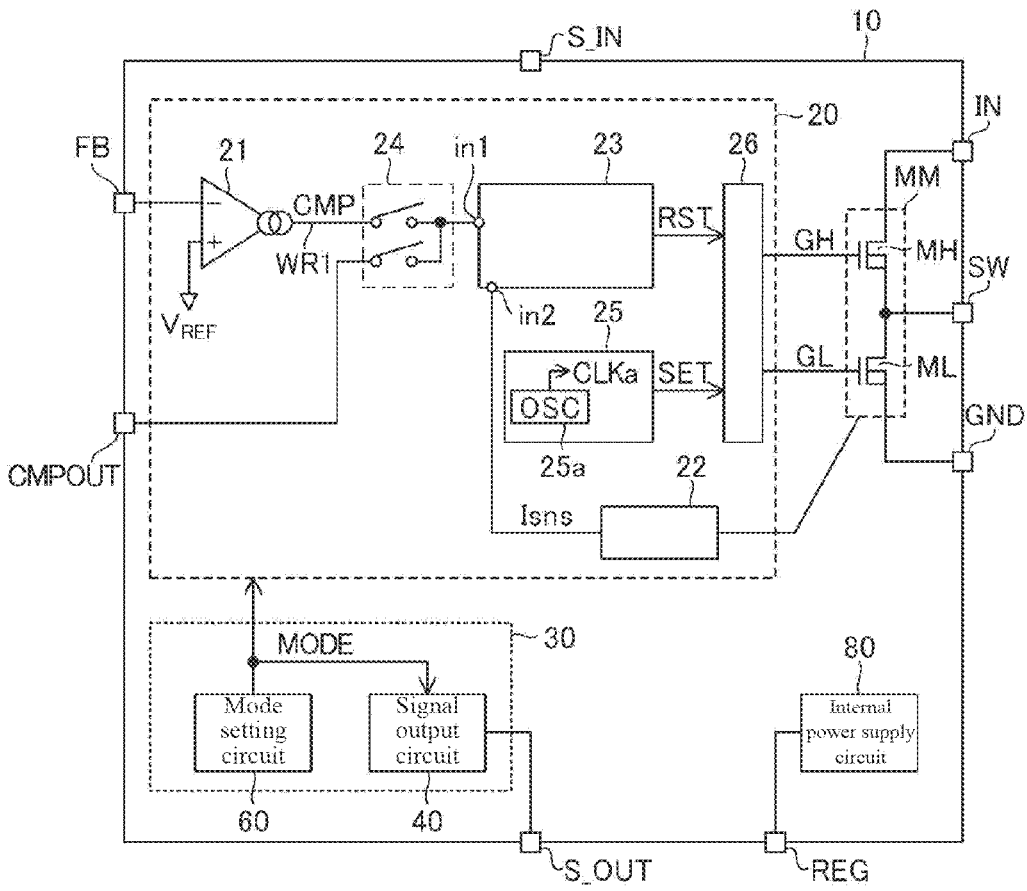
FIG. 4 is an internal configuration diagram of a switching power device according to an embodiment of the present disclosure.

FIG. 4 shows an internal configuration of one power supply control device 10. The internal configurations of the power supply control devices 10[1] and 10[2] are same as each other. Thus, the internal configuration of the power supply control device 10 is described by focusing on one power supply control device 10. However, there are differences between operations of the power supply control devices 10[1] and 10[2], and these differences are to be appropriately described shortly. The power supply control device 10 includes an output section MM, and a switching control circuit 20 configured to control switching of the output section MM, and further includes a synchronization management circuit 30 and an internal power supply circuit 80. The synchronization management circuit 30 includes a signal output circuit 40 connected to the synchronous output terminal S_OUT, and a mode setting circuit 60. For brevity in the description, the power supply control device 10 or 10[i] is mostly written as 10 or 10[i] for short.

The output section MM is disposed between the application end (the input terminal IN) of the input voltage Vin and the application end (the output terminal OUT) of the output voltage Vout, and cooperates with the coil L and the output capacitor Cout by switching of the input voltage Vin to generate the output voltage Vout. The output section MM includes transistors MH and ML implemented by N-channel MOSFETs. The transistors MH and ML are a pair of switching elements connected in series between the input terminal IN and the ground terminal GND (in other words, the ground), and the input voltage Vin is switched by controlling switching (driven by switching) of the transistors MH and ML, such that a switching voltage in a rectangular wave appears at the switching terminal SW. The transistor MH is disposed at a high potential side compared with the transistor ML. More specifically, a drain of the transistor MH is connected to the input terminal IN which is the application end of the input voltage Vin, and receives a supply of the input voltage Vin. A source of the transistor MH and a drain of the transistor ML are commonly connected to the switching terminal SW. A source of the transistor ML is connected to the ground terminal GND (that is, grounded). However, there are cases where a resistor for current detection is placed between the source of the transistor ML and the ground terminal GND.

The transistor MH functions as an output element (an output transistor), and the transistor ML functions as a rectifier (a synchronous rectifier transistor). During the switching control of the output section MM, the output element (MH) and the rectifier (ML) are alternately turned on and turned off. The coil L connected to the switching terminal SW and the output capacitor Cout form a rectifier and smoothing circuit that rectifies and smooths the switching voltage in a rectangular wave appearing at the switching terminal SW (see FIG. 1).

Gate signals GH and GL are respectively supplied to the gates of the transistors MH and ML as drive signals, and the transistors MH and ML are turned on or turned off according to the gate signals GH and GL. The transistor MH in an on state when the gate signal GH is at a high level, and the transistor MH is in an off state when the gate signal GH is at a low level. Similarly, the transistor ML in an on state when the gate signal GL is at a high level, and the transistor ML is in an off state when the gate signal GL is at a low level. Basically, the transistors MH and ML are turned on and turned off alternately; however, sometimes both of the transistors MH and ML are kept as being turned off. The transistors MH and ML are not set to be concurrently turned on. Moreover, at least one of the output element (MH) and the rectifier (ML) can be disposed external to the device 10. Sometimes the output section MM is entirely disposed external to the device 10.

During an on period of the transistor MH, the coil current IL flows through a channel (between the drain and the source) of the transistor MH. During an off period of the transistor MH, the coil current IL flows through a channel of the transistor ML or a parasitic diode of the transistor ML.

The input voltage Vin is electrically converted into the output voltage Vout by controlling switching of the output section MM. The switching control circuit 20 is in charge of switching control of the output section MM, and the input voltage Vin is converted into the output voltage Vout by controlling switching of the output section MM. In the switching control, the switching control circuit 20 controls the respective on/off states of the transistors MH and ML by controlling levels of the gate signals GH and GL, accordingly generating the desired output voltage Vout at the output terminal OUT. When the two switching control circuits 20 in the two devices 10 perform switching control simultaneously, with the cooperation of the two devices 10, the input voltage Vin is converted into the output voltage Vout.

Moreover, the gate signal GL is a signal regarding the ground potential as a reference, and the gate signal GH is a signal regarding a potential of the switching terminal SW as a reference. The gate signal GH at a low level has the potential of the switching terminal SW, and the gate signal GH at a high level is greater than a predetermined voltage when viewing from the potential of the switching terminal SW. The predetermined voltage herein is greater than a gate threshold voltage of the transistor MH. A step-up power supply for generating the gate signal GH can be formed by using a generally known bootstrap circuit (not shown). The transistor MH can also be implemented by a P-channel MOSFET, and in this case, no step-up power supply is needed.

Moreover, as a variation example, a diode rectification approach can also be used in the device 10. In this case, as a rectifier, a synchronous rectifier diode having an anode connected the ground terminal GND and a cathode connected to the switching terminal SW can be used in substitution for the transistor ML. In this case, only the output element (MH) is turned on or turned off during the switching control of the output section MM. In all cases, by switching the output element (MH) between on and off during the switching control of the output section MM, the output voltage Vout is generated based on the current (IL) flowing to the coil L.

Figure 5:
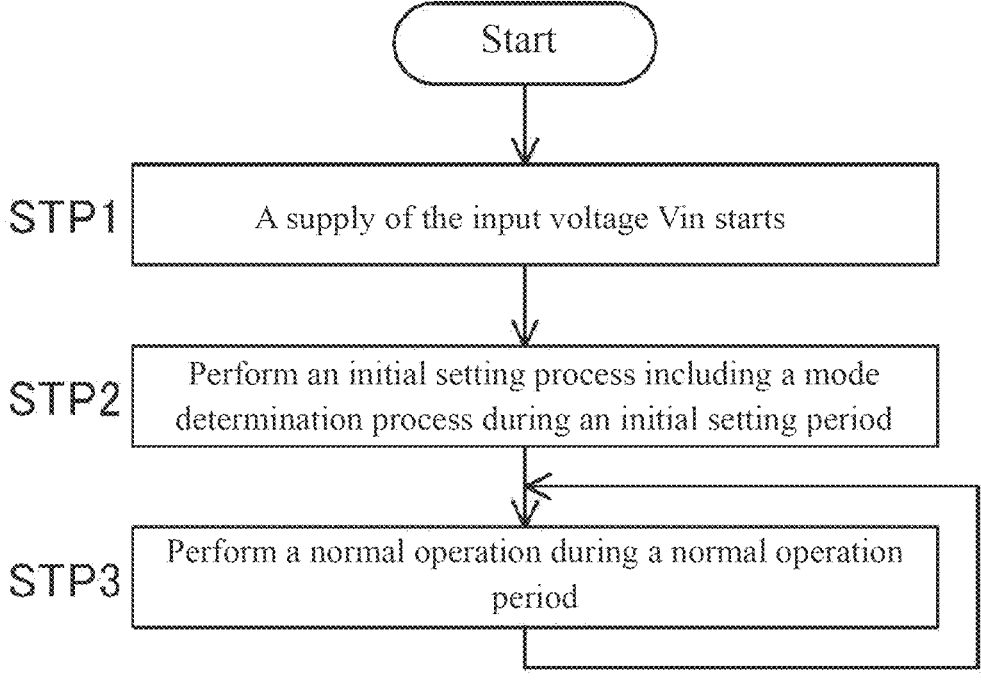
FIG. 5 is a flowchart of operations of a switching power device according to an embodiment of the present disclosure.

The mode setting circuit 60 disposed in the device 10 is first described with reference to FIG. 5 before operation details of the switching control circuit 20 are described. FIG. 5 shows a flowchart of operations of the device 10. In step STP1, a supply of the input voltage Vin to the device 10 starts, an then in step STP2, the device 10 performs an initial setting process. A period during which of the initial setting process is performed is referred to as an initial setting period. In the initial setting process, initializations of signals within the device 10 are performed. The initial setting process includes a mode determination process. Thus, the mode determination process is performed within the initial setting period. Once the initial setting process ends, in step STP3, the device 10 performs a normal operation. A period in which the normal operation is performed is referred to as a normal operation period. Once the normal operation starts, basically the normal operation is performed continuously before the supply of the input voltage Vin is interrupted.

In the device 10[$i$], the mode setting circuit 60 performs the mode determination process, and the operation mode of the device 10[$i$] is set to a first mode or a second mode according to a result of the mode determination process. In the switching power device 1, the operation mode of the device 10[1] is set to the first mode and the operation mode of the device 10[2] is set to the second mode, with details of setting the operation modes described below.

The mode setting circuit 60 supplies a mode setting signal MODE representing an operation mode setting result to the various circuits in the device 10. More specifically, to set the operation mode of the device 10[$i$] to the first mode, the mode setting circuit 60 of the device 10[$i$] supplies the first mode setting signal MODE indicative of the above to the various circuits in the device 10[$i$]. To set the operation mode of the device 10[$i$] to the second mode, the mode setting circuit 60 of the device 10[$i$] supplies the second mode setting signal MODE indicative of the above to the various circuits in the device 10[$i$]. In the switching power device 1, after the mode determination process, the first mode setting signal MODE is supplied to the various circuits in the device 10[1], and the second mode setting signal MODE is supplied to the various circuits in the device 10[2]. In the description below, the device 10 in the first mode refers to the device 10 in an operation mode set to the first mode and the device 10 in the second mode refers to the device 10 in an operation mode set to the second mode.

The operations of the device 10, and more particularly the operations of the switching control circuit 20 and the signal output circuit 40, are related to a greater extent to setting details of the operation modes. Thus, the operation mode of the device 10 (to be briefly referred to as an operation mode below) can be understood as the operation modes of the switching control circuit 20 and the signal output circuit 40 among the constituting elements of the device 10. As shown in FIG. 4, the mode setting signal MODE is supplied to the switching control circuit 20 and the signal output circuit 40.

The internal configuration of the switching control circuit 20 as well as operations of various parts in the switching control circuit 20 during the normal operation period are described below. The operations of the various parts in the switching control circuit 20 are included within a normal operation (see FIG. 5). The switching control circuit 20 includes an error amplifier 21, a sensing circuit 22, a reset circuit 23, a switching circuit 24, a setting circuit 25 and a controller 26.

The error amplifier 21 is a current output transconductance amplifier. The error amplifier 21 includes an inverting input terminal, a non-inverting input terminal and an output terminal. The inverting input terminal of the error amplifier 21 is connected to the feedback terminal FB. A predetermined reference voltage Vref is supplied to the non-inverting input terminal of the error amplifier 21. The reference voltage Vref is a DC voltage having a positive predetermined voltage value, and is generated by a reference voltage generating circuit (not shown) in the device 10. An output terminal of the error amplifier 21 is connected to a wiring WR1.

The error amplifier 21 is active only in the device 10 in the first mode, and is inactive (non-operative) in the device 10 in the second mode. In the device 10[$i$], the first or second mode setting signal MODE from the mode setting circuit 60 is supplied to the switching control circuit 20. The switching control circuit 20 activates the error amplifier 21 when the first mode setting signal MODE is supplied to the switching control circuit 20, and does not activate the error amplifier 21 (deactivates the error amplifier 21) when the second mode setting signal MODE is supplied to the switching control circuit 20. Thus, between the error amplifiers 21 of the devices 10[1] and 10[2], only the error amplifier 21 of the device 10[1] is activated. Moreover, when the device 10[1] is started, only soft-start control for slowly increasing a value of the reference voltage Vref from 0 V to the positive predetermined voltage value is required; however, the existence of the soft-start control is omitted below.

In the device 10[1], the feedback voltage Vfb is input to the inverting input terminal of the error amplifier 21, the error amplifier 21 outputs a current signal corresponding to a difference between the feedback voltage Vfb and the reference voltage Vref from its output terminal, such that the wiring WR1 generates an error signal CMP corresponding to the difference between the feedback voltage Vfb and the reference voltage Vref. The error signal CMP, and signals Isns, SET and RST below are all voltage signals. In any voltage signal, rising and falling of the voltage signal represent increasing and decreasing of a potential of the voltage signal. The same applies to other similar expressions.

In the device 10[1], the error amplifier 21 outputs a current from its output terminal to the wiring WR1 when "Vfb<Vref" holds true such that the potential of the error signal CMP increases, and feeds in a current from the wiring WR1 to its output terminal when "Vfb>Vref" holds true such that the potential of the error signal CMP decreases. Moreover, a phase compensation circuit (omitted from the drawings) including a capacitor can also be connected between the wiring WR1 and ground.

The sensing circuit 22 detects the coil current IL, and generates the sensing signal Isns representing a detection result of the coil current IL. The potential of the sensing signal Isns increases as the coil current IL increases, and the potential of the sensing signal Isns decreases as the coil current IL decreases. The coil current IL detected by the sensing circuit 22 of the device 10[i] is a coil current IL [i].

The sensing circuit 22 can generate the sensing signal Isns by detecting a current (that is, the coil current IL) flowing to the transistor MH during the on period of the transistor MH or by detecting a current (that is, the coil current IL) flowing to the transistor ML during the on period of the transistor ML. Alternatively, a shunt resistor (not shown) can also be placed between the connection node of the transistors MH and ML and the coil L. At this point in time, the sensing circuit 22 can generate the sensing signal Isns based on a voltage drop of the shunt resistor. Moreover, the sensing signal Isns can also be generated by detecting a voltage at any part that generates a voltage corresponding to the coil current IL.

The reset circuit 23 includes input terminals in1 and in2. The sensing signal Isns is supplied to the input terminal in2 of the reset circuit 23. The switching circuit 24 is disposed between the input terminal in1 of the reset circuit 23, the wiring WR1 and the error sharing terminal CMPOUT. The switching circuit 24 has either one of a first switching state and a second switching state. The switching control circuit 20 sets the switching circuit 24 to the first switching state when the first mode setting signal MODE is supplied to the switching control circuit 20, and sets the switching circuit 24 to the second switching state when the second mode setting signal MODE is supplied to the switching control circuit 20. Thus, the switching circuit 24 of the device 10[1] is set to the first switching state, and the switching circuit 24 of the device 10[2] is set to the second switching state.

Figure 6:
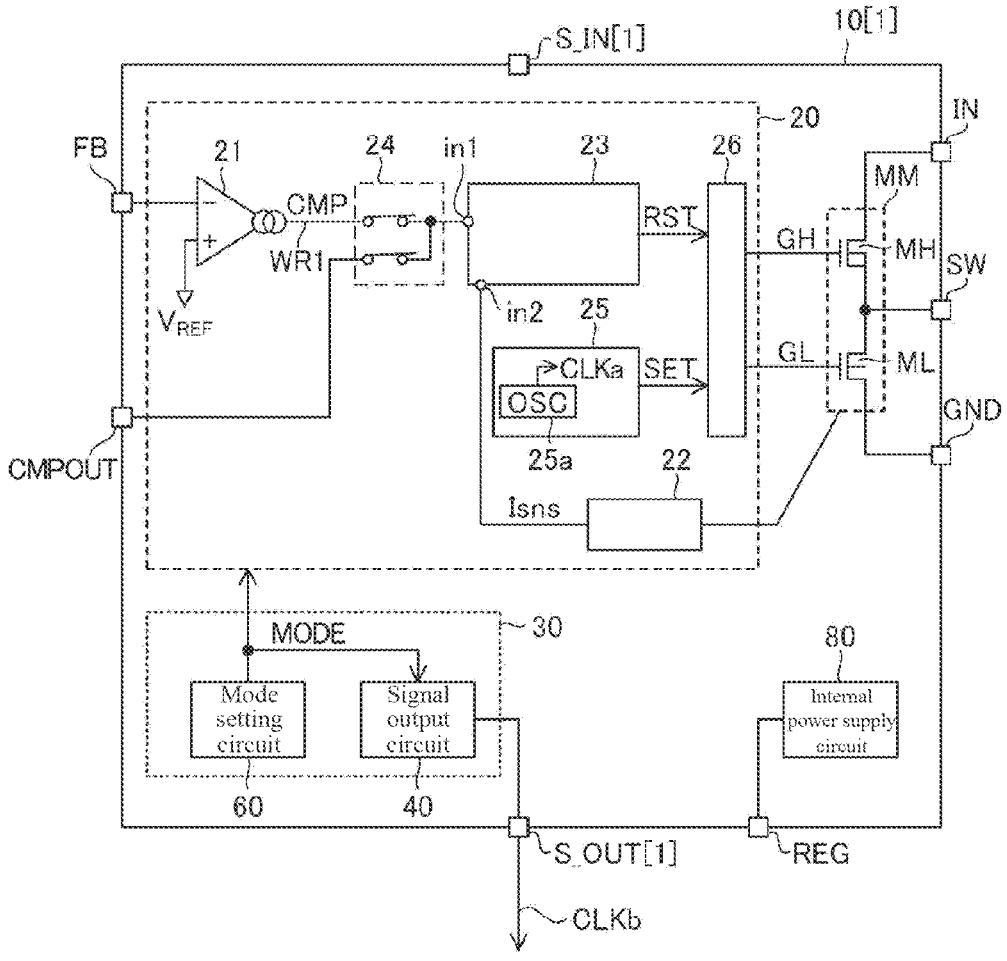
FIG. 6 is an internal configuration diagram of a first power supply control device according to an embodiment of the present disclosure.
Figure 7:
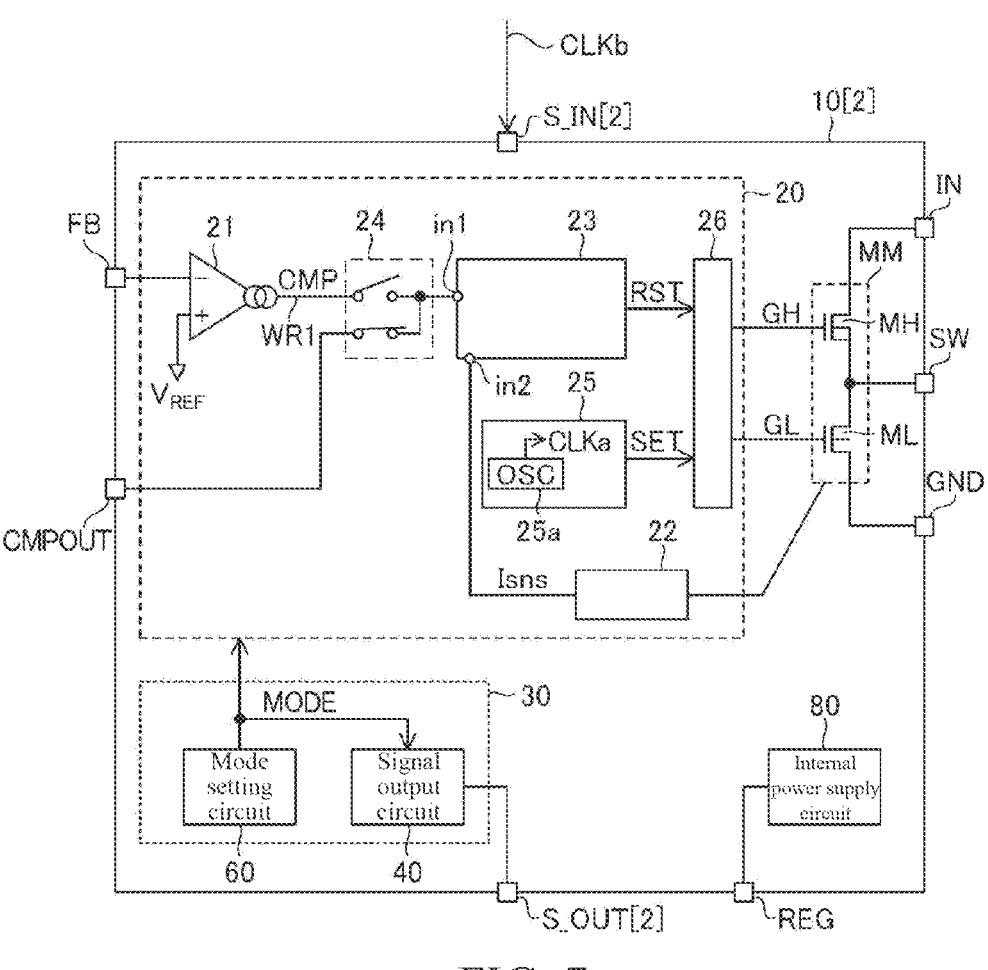
FIG. 7 is an internal configuration diagram of a second power supply control device according to an embodiment of the present disclosure.

FIG. 6 shows a situation where the switching circuit 24 of the device 10[1] is set to the first switching state, and FIG. 7 shows a situation where the switching circuit 24 of the device 10[2] is set to the second switching state. In the device 10[1], as shown in FIG. 6, the switching circuit 24 in the first switching state causes the wiring WR1 to be connected to the input terminal in1 of the reset circuit 23 and the error sharing terminal CMPOUT. Thus, the error signal CMP generated by the error amplifier 21 in the device 10[1] is input to the input terminal in1 of the reset circuit 23 in the device 10[1]. In the device 10[2], as shown in FIG. 7, the switching circuit 24 in the second switching state causes the wiring WR1 to be not connected to the input terminal in1 of the reset circuit 23, such that the error sharing terminal CMPOUT is connected to the input terminal in1 of the reset circuit 23. As described above, the error sharing terminals CMPOUT in the devices 10[1] and 10[2] are connected to each other (see FIG. 3) by the external wiring Wc, and thus the error signal CMP generated by the error amplifier 21 in the device 10[1] is also input to the input terminal in1 of the reset circuit 23 in the device 10[2].

Moreover, FIG. 6 further shows a situation where a clock signal CLKb is output from the synchronous output terminal S_OUT[1] of the device 10[1] during the normal operation period. FIG. 7 further shows a situation where the clock signal CLKb is input to the synchronous input terminal S_IN[2] of the device 10[2] during the normal operation period. Details of the clock signal CLKb are described below.

The reset circuit 23 generates, by means of pulse width modulation, and outputs the signal RST based on the error signal CMP and the sensing signal Isns supplied to the input terminals in1 and in2.

The setting circuit 25 includes an oscillation circuit 25a, and generates and outputs the signal SET. The signals SET and RST are binary signals having a high level or a low level. The oscillation circuit 25a is an example of a reference clock signal generating circuit generating and outputting a reference clock signal CLKa. The reference clock signal CLKa is a clock signal having a predetermined frequency fpwm. Any clock signal alternately has a high level and a low level. Sometimes the clock signal CLKb different from the reference clock signal CLKa is input from the exterior of the device 10 to the synchronous input terminal S_IN. The setting circuit 25 generates and outputs a binary signal based on the reference clock signal CLKa or a binary signal based on the clock signal CLKb, as the signal SET.

Figure 8:
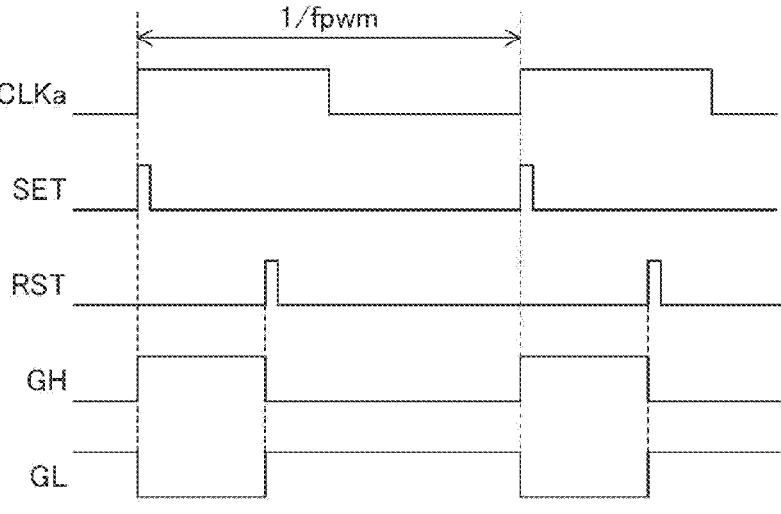
FIG. 8 is a waveform diagram of several signals in a first power supply control device according to an embodiment of the present disclosure.

FIG. 8 shows waveforms of several signals in the device 10[1]. In the device 10[1] operating in the first mode, the setting circuit 25 generates and outputs the signal SET based on the reference clock signal CLKa. The setting circuit 25 in the device 10[1] in principle sets the level of the signal SET to a low level, but sets the level of the signal SET temporarily to a high level by using a rising edge of the reference clock signal CLKa as an opportunity. Thus, in the device 10[1], a rising edge in the signal SET is generated at an instant of a rising edge of the reference clock signal CLKa. In the device 10[1], the reference clock signal CLKa itself can also be used as the signal SET.

In the switching power device 1, during the normal operation period, the clock signal CLKb output from the synchronous output terminal S_OUT[1] is further input to the synchronous input terminal S_IN[2] (further refer to FIG. 6 and FIG. 7). The clock signal CLKb is an output clock signal for the device 10[1], but is an input clock signal for the device 10[2].

Figures 9, 10:
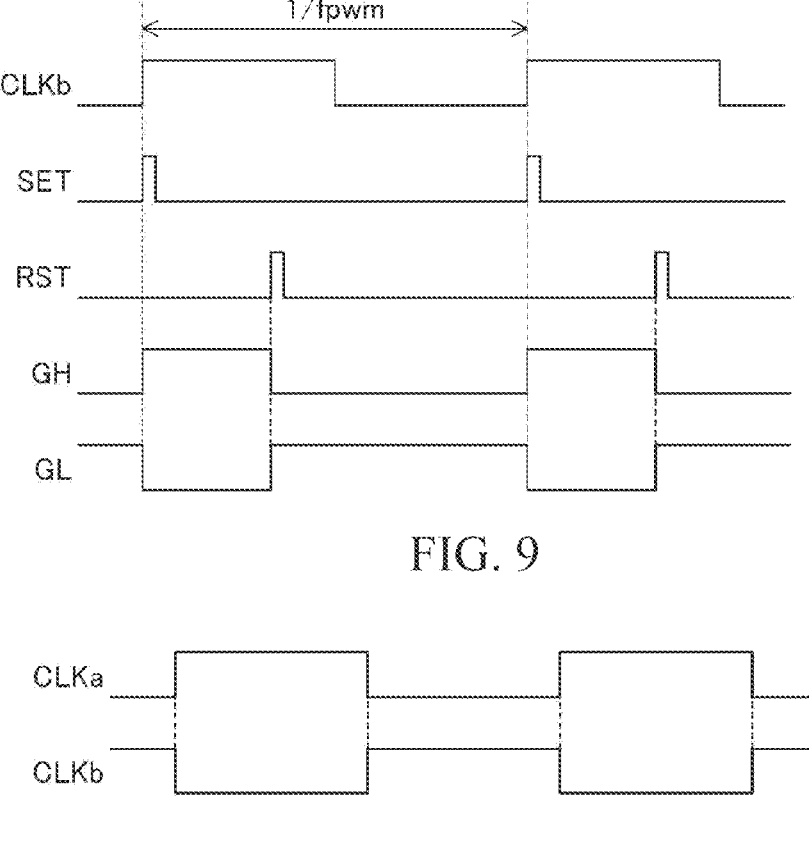
FIG. 9 is a waveform diagram of several signals in a second power supply control device according to an embodiment of the present disclosure.
FIG. 10 is a relationship diagram of two clock signals according to an embodiment of the present disclosure.

FIG. 9 shows waveforms of several signals in the device 10[2]. In the device 10[2] operating in the second mode, the setting circuit 25 generates and outputs the signal SET based on the input clock signal CLKb. The setting circuit 25 in the device 10[2] in principle sets the level of the signal SET to a low level, but sets the level of the signal SET temporarily to a high level by using a rising edge of the input clock signal CLKb as an opportunity. Thus, in the device 10[2], a rising edge in the signal SET is generated at an instant of a rising edge of the input clock signal CLKb. In the device 10[2], the input clock signal CLKb itself can also be used as the signal SET.

The signal SET from the setting circuit 25 and the signal RST from the reset circuit 23 are input to the controller 26

(see FIG. 4). The controller 26, by using a rising edge of the signal SET as an opportunity, turns on the transistor MH by generating a rising edge in the gate signal GH and turns off the transistor ML by generating a falling edge in the gate signal GL. The controller 26, by using a rising edge of the signal RST as an opportunity, turns off the transistor MH by generating a falling edge in the gate signal GH and turns on the transistor ML by generating a rising edge in the gate signal GL.

The signal SET in the device 10[1] and the reference clock signal CLKa generated in the device 10[1] are synchronous. Thus, the controller 26 in the device 10[1] controls switching of the output section MM in synchronization with the reference clock signal CLKa generated in the device 10[1]. In contrast, the signal SET in the device 10[2] is synchronous with the input clock signal CLKb supplied o the synchronous input terminal S_IN[2]. Thus, the controller 26 in the device 10[2] controls switching of the output section MM in synchronization with the input clock signal CLKb supplied to the synchronous input terminal S_IN[2].

"Vfb=Vref" when "Vout=Vtg". When "Vfb<Vref" holds true as the current supplied to the load LD increases, the error signal CMP increases. When "CMP>Isns" holds true as the error signal CMP increases, the reset circuit 23 generates the signal RST to increase a duty cycle of the output section MM. The increase in the duty cycle of the output section MM increases the coil current IL, and the increase in the coil current IL increases the output voltage Vout and the sensing signal Isns. Conversely, when "Vfb>Vref" holds true as the current supplied to the load LD decreases, the error signal CMP decrease. When "CMP<Isns" holds true as the error signal CMP decreases, the reset circuit 23 generates the signal RST to decrease the duty cycle of the output section MM. The decrease in the duty cycle of the output section MM decreases the coil current IL, and the decrease in the coil current IL decreases the output voltage Vout and the sensing signal Isns. With the approach above, a difference between the output voltage Vout and the target voltage Vtg is controlled and reduced in the switching power device 1 (in the device 10 performing the switching control).

The duty cycle of the output section MM indicates a ratio of the on period of the transistor MH to a sum of the on period and the off period of the transistor MH. There are various other configurations that can serve a configuration for controlling switching of the output section MM based on information (Vfb) of the output voltage Vout and information (Isns) of the coil current IL, and any configuration can be used to implement the switching control in the switching control circuit 20 as desired.

In the switching power device 1, during the normal operation period, a current is supplied from the application end of the input voltage Vin to the application end of the output voltage Vout by the output sections MM in the devices 10[1] and 10[2]. At this point in time, the common error signal CMP between the devices 10[1] and 10[2] is used for a current mode control, and thus magnitudes of the coil currents IL [1] and IL [2] are substantially equal.

Operation details of the mode setting circuit 60 are described below. In the mode determination process, the mode setting circuit 60 in the device 10[i] determines a specific voltage is supplied from the exterior of the device 10[i] to the synchronous output terminal S_OUT[i]. A state in which the specific voltage is supplied to the synchronous output terminal S_OUT[i] is referred to as a supply state of the specific voltage, and a state in which the specific voltage is not supplied to the synchronous output terminal S_OUT[i] is referred to as a non-supply state of the specific voltage.

The specific voltage is a voltage satisfying a predetermined condition. The specific voltage satisfying the predetermined condition is a voltage having a level above that of a predetermined upper threshold voltage Vth_H. In the synchronization management circuit 30, the level of the upper threshold voltage Vth_H is a high level. That is, in the various signals in the synchronization management circuit 30, a high level refers to a potential above the predetermined upper threshold voltage Vth_H; in the various signals in the synchronization management circuit 30, a low level refers to a potential below a predetermined lower threshold voltage Vth_L. Herein, "0<Vth_L<Vth_H<Vreg" holds true. Thus, the internal power supply voltage Vreg is considered the specific voltage satisfying the predetermined condition. For example, "Vth_L=Vreg×0.3", and "Vth_H=Vreg×0.7".

In the switching power device 1, the internal power supply voltage Vreg (see FIG. 3) is supplied to the synchronous output terminal S_OUT[2] of the device 10[2], and thus the synchronous output terminal S_OUT[2] is in the supply state of the specific voltage.

When the supply state of the specific voltage to the synchronous output terminal S_OUT[i] is determined (that is, when the specific voltage is currently supplied to the synchronous output terminal S_OUT[i]), the mode setting circuit 60 in the device 10[i] sets the operation mode (that is, the operation modes of the switching control circuit 20 and the signal output circuit 40 of the device 10[i]) of the device 10[i] to the second mode. Thus, by outputting the second mode setting signal MODE matching the determination result, the mode setting circuit 60 in the device 10[2] sets the operation mode (that is, the operation modes of the switching control circuit 20 and the signal output circuit 40 of the device 10[2]) of the device 10[2] to the second mode.

On the other hand, in the switching power device 1, the specific voltage is not supplied to the synchronous output terminal S_OUT[1] of the device 10[1] from the exterior. Although the synchronous output terminal S_OUT[1] is connected to the synchronous input terminal S_IN[2], the synchronous input terminal SIN[1] is substantially in an open state because the device 10[2] does not have a function of outputting a signal from the synchronous input terminal S_IN[2].

When the non-supply state of the specific voltage to the synchronous output terminal S_OUT[i] is determined (that is, when the specific voltage is not supplied to the synchronous output terminal S_OUT[i]), the mode setting circuit 60 in the device 10[i] sets the operation mode (that is, the operation modes of the switching control circuit 20 and the signal output circuit 40 of the device 10[i]) of the device 10[i] to the first mode. Thus, by outputting the first mode setting signal MODE matching the determination result, the mode setting circuit 60 in the device 10[1] sets the operation mode (that is, the operation modes of the switching control circuit 20 and the signal output circuit 40 of the device 10[1]) of the device 10[1] to the first mode.

When the signal output circuit 40 itself is supplied with the first mode setting signal MODE, the clock signal CLKb based on the reference clock signal CLKa is output from the synchronous output terminal S_OUT during the normal operation period. Thus, the signal output circuit 40 of the device 10[1] outputs the clock signal CLKb based on the reference clock signal CLKa from the synchronous output terminal S_OUT[1] during the normal operation period. FIG. 10 shows waveforms of the clock signals CLKa and CLKb. Frequencies of the clock signals CLKa and CLKb are same as each other. Phases of the reference clock signal CLKa generated in the device 10[1] and the clock signal CLKb output by the signal output circuit 40 of the device 10[1] (in other words, the clock signal CLKb supplied to the device 10[2]) are offset by 180° from each other. The amount of phase offset differ somewhat from 180°.

When supplied with the second mode setting signal MODE, the signal output circuit 40 does not output the clock signal CLKb from the synchronous output terminal S_OUT during the normal operation period, such that an input impedance of the synchronous output terminal S_OUT is kept in an extremely high state (at least, compared with when supplied with the first mode setting signal MODE, the input impedance of the synchronous output terminal S_OUT is kept in an extremely high state). Thus, the signal output circuit 40 of the device 10[2] does not output the clock signal CLKb from the synchronous output terminal S_OUT [2] during the normal operation period, and thus keeps the input impedance of the synchronous output terminal S_OUT [2] to be in an extremely high state.

The internal power supply circuit 80 generates more than one internal power supply voltage including the internal power supply voltage Vreg based on the input voltage Vin. The switching control circuit 20 and the synchronization management circuit 30 operate based on the internal power supply voltage generated by the internal power supply circuit 80, or based on the input voltage Vin.

In the multiple embodiments below, some specific configuration examples, operation examples, application techniques and variation techniques related to the switching power device 1 or the power supply control device 10 are described. Unless otherwise specified and without causing any contradiction, the items described in this embodiment are similarly applicable to embodiments in the following description. In the various embodiments, the description of the embodiments are prioritized in the presence of any items contradictory to the items described above. Provided there are not contradictions, the items described in any one of the multiple embodiments below are also applicable to any other embodiment (that is to say, any two or more of the embodiments can be combined).

First Embodiment

Figure 11:
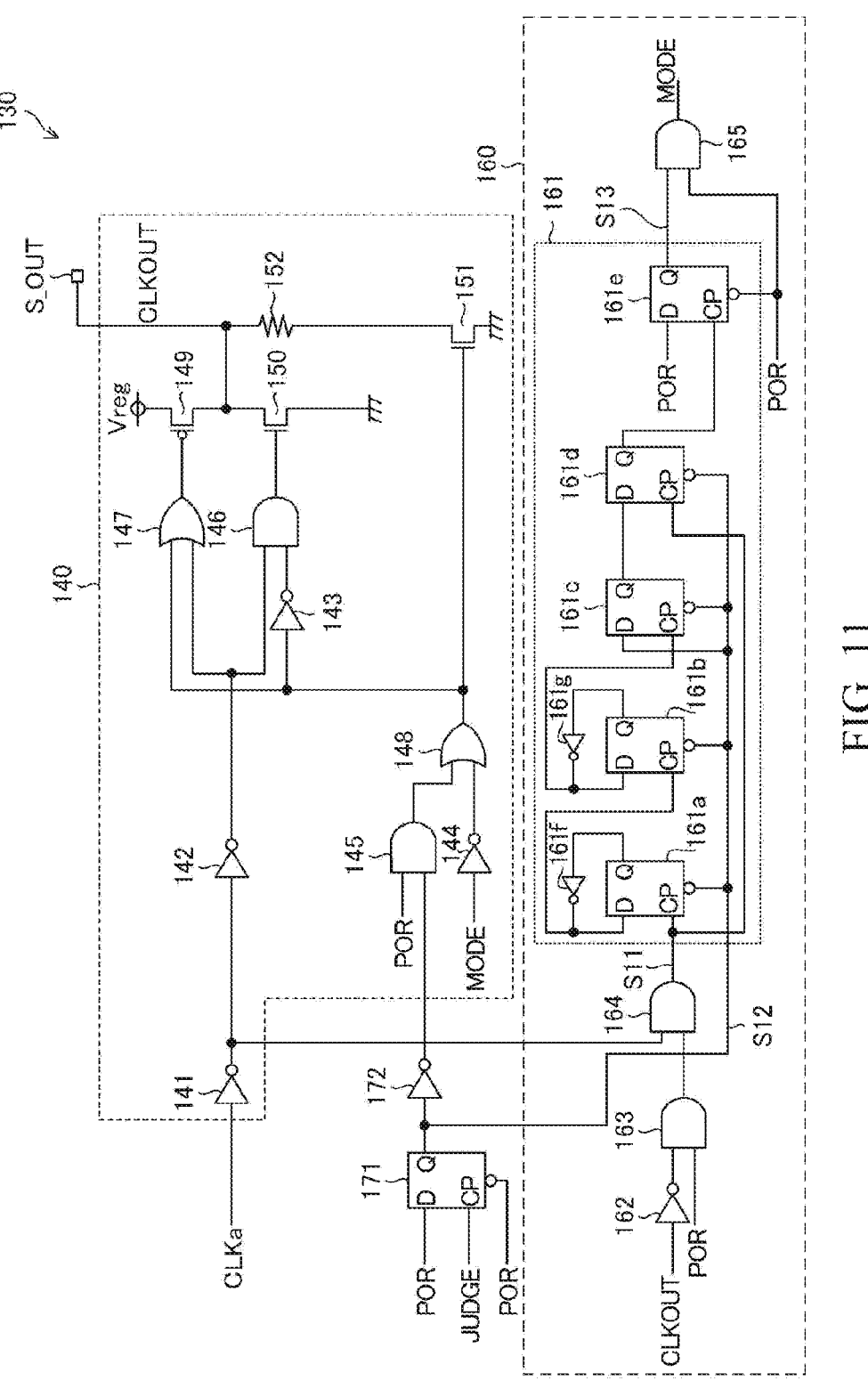
FIG. 11 is a circuit diagram of a synchronization management circuit according to a first embodiment of the embodiments of the present disclosure.

The first embodiment is described below. FIG. 11 shows a circuit diagram of a synchronization management circuit 130 according to the first embodiment. The synchronization management circuit 130 includes a signal output circuit 140 and a mode setting circuit 160. In the first embodiment, the synchronization management circuit 130, the signal output circuit 140, the mode setting circuit 160 are used as the synchronization management circuit 30, the signal output circuit 40 and the mode setting circuit 60 in each device 10, respectively (refer to FIG. 4).

The signal output circuit 140 includes inverting circuits 141 to 144, AND circuits 145 and 146, OR circuits 147 and 148, transistors 149 to 151, and a resistor 152. The mode setting circuit 160 includes a synchronous circuit 161, an inverting circuit 162, and AND circuits 163 to 165. The synchronization management circuit 130 further includes a D flip flop (DFF) 171 and an inverting circuit 172. The synchronous circuit 161 includes multiple DFFs and multiple inverting circuits. The transistor 149 is a P-channel MOSFET, and the transistors 150 and 151 are N-channel MOSFETs.

Any inverting circuit has an input end and an output end, and an inverted signal is output from the output end to the input signal of the input end. For any inverting circuit, the input signal to the inverting circuit refers to a signal input to the input end of the inverting circuit, and the output signal of the inverting circuit refers to a signal output from the output end of the inverting circuit.

The AND circuits 145, 146, and 163 to 165 are all dual-input AND circuits (and gate circuits). The dual-input AND circuit has a first input end, a second input end and an output end. A logical product signal of an input signal to the first input terminal and an input signal to the second input terminal is output from the output terminal. For any AND circuit, the output signal of the AND circuit refers to a signal output from the output end of the AND circuit.

The OR circuits 147 and 148 are both dual-input OR circuits (or gate circuits). The dual-input OR circuit has a first input end, a second input end and an output end. A logical sum signal of an input signal to the first input terminal and an input signal to the second input terminal is output from the output terminal. For any OR circuit, the output signal of the OR circuit refers to a signal output from the output end of the OR circuit.

Figure 12:
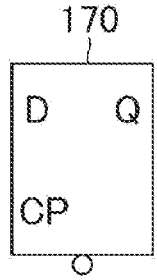
FIG. 12 is a diagram of one D-type flip flop (D flip flop) represented by the first embodiment of the embodiments of the present disclosure.

The DFF 171 and each DFF in the synchronous circuit 161 have the same configuration as the DFF 170 in FIG. 12. The DFF 170 is a positive edge triggered D flip flop, and has a data input end (D), a data output end (Q), a clock input end (CP) and a negative logic reset input end. A stored value of the DFF 170 is "0" or "1". When the DFF 170 has the value "0" stored therein, a signal at a low level is output from the data output end (Q); when the DFF 170 has the value "1" stored therein, a signal at a high level is output from the data output end (Q). When an input signal to the reset input end has a low level, the DFF 170 is in a reset state, and the DFF 170 in the reset state always has the value "0" stored therein. During a period in which the input signal to the reset input end has a high level, a rising edge is generated in an input signal to the clock input end (CP), and the DFF 170 imports and stores a value of an input signal to the data input end (D) at an instant of the rising edge. The value of the input signal to the data input end (D) is "1" when the input signal to the data input end (D) has a high level, and is "0" when the input signal to the data input end (D) has a low level. Provided that a rising edge is not generated in the input signal to the clock input end (CP) during the period in which the input signal to the reset input end has a high level, the DFF 170 keeps a current stored value. For any DFF, the output signal of the DFF refers to a signal output from the data output end (Q) of the DFF.

Details of connections of various elements and input/ output relationships of the signals in the synchronization management circuit 130 are described below. The reference clock signal CLKa is input to the input end of the inverting circuit 141. An output signal of the inverting circuit 141 is input to the input end of the inverting circuit 142. A signal POR is input to the data input end (D) and the reset input end of the DFF 171, and a signal JUDGE is input to the clock input end (CP) of the DFF 171. The data output end (Q) of the DFF 171 is connected to the input end of the inverting circuit 172. The signal POR is input to the first input end of the AND circuit 145, and an output signal of the inverting circuit 172 is input to the second input end of the AND circuit 145. The mode setting signal MODE is input to the input end of the inverting circuit 144. An output signal of the AND circuit 145 and an output signal of the inverting circuit 144 are respectively input to the first input end and the second input end of the OR circuit 148.

An output signal of the OR circuit 148 is input to the first input end of the OR circuit 147 and the input end of the inverting circuit 143. An output signal of the inverting circuit 142 is input to the second input end of the OR circuit 147. An output signal of the inverting circuit 142 is also input to the first end input of the AND circuit 146. An output signal of the inverting circuit 143 is input to the second input end of the AND circuit 146.

A source of the transistor 149 is connected to an application end of the internal power supply voltage Vreg, and receives a supply of the internal power supply voltage Vreg. Each of drains of the transistor 149 and the transistor 150 is connected to the synchronous output terminal S_OUT. The synchronous output terminal S_OUT is connected to a first end of the resistor 152, and a second end of the resistor 152 is connected to a drain of the transistor 151. Each of sources of the transistors 150 and 151 is grounded. A signal in the synchronous output terminal S_OUT is referred to as a signal CLKOUT. The output end of the OR circuit 147, the output end of the AND circuit 146 and the output end of the OR circuit 148 are connected to gates of the transistors 149, 150 and 151, respectively. The transistor 149 is turned on when the output signal of the OR circuit 147 has a low level, and the transistor 149 is turned off when the output signal of the OR circuit 147 has a high level. The transistor 150 is turned on when the output signal of the AND circuit 146 has a high level, and the transistor 150 is turned off when the output signal of the AND circuit 146 has a low level. The transistor 151 is turned on when the output signal of the OR circuit 148 has a high level, and the transistor 151 is turned off when the output signal of the OR circuit 148 has a low level.

The input end of the inverting circuit 162 is connected to the synchronous output terminal S_OUT so as to receive the signal CLKOUT. An output signal of the inverting circuit 162 is input to the first input end of the AND circuit 163, and the signal POR is input to the second input end of the AND circuit 163. An output signal of the inverting circuit 141 and an output signal of the AND circuit 163 are respectively input to the first input end and the second input end of the AND circuit 164. An output signal of the AND circuit 164 is specifically referred to as a signal S11. An output signal of the DFF 171 is specifically referred to as a signal S12.

The signals S11, S12 and POR are input to the synchronous circuit 161. Only during a period in which the output signal of the AND circuit 163 has a high level, an inverted signal of the reference clock signal CLKa is used as the signal S11 input to the synchronous circuit 161. When the signal S11 is the inverted signal of the reference clock signal CLKa, the signal S11 is specifically referred to as a clock signal S11. The clock signal S11 is not generated when the output signal of the AND circuit 163 has a low level, and the signal S11 is maintained at a low level. The synchronous circuit 161 outputs a signal S13 based on the signals S11, S12 and POR. The signals S13 and POR are respectively input to the first input end and the second input end of the AND circuit 165. An output signal of the AND circuit 165 is the mode setting signal MODE.

The synchronous circuit 161 is a circuit driven in synchronization with the clock signal S11. The synchronous circuit 161 in principle sets the signal S13 to a low level. If a rising edge is generated a predetermined number of times (5 times in this case) in the clock signal S11 during a period in which both of the signals S12 and POR are at a high level, the synchronous circuit 161 generates a rising edge in the signal S13, and the signal S13 is maintained at a high level after that. When an input of the clock signal S11 to the synchronous circuit 161 is disconnected (that is, when the signal S11 is maintained at a low level), the signal S13 is maintained at an initial level, that is, at a low level.

More specifically, the synchronous circuit 161 includes DFFs 161a to 161e, and inverting circuits 161f and 161g. A counter formed by the DFFs 161a to 161d and the inverting circuits 161f and 161g is driven in synchronization with the clock signal S11. It can be understood as that the DFF 161e is also included in the constituting elements of the counter. The signal S11 is supplied to each of clock input ends (CP) of the DFF 161a and 161d. The signal S12 is supplied to each of reset input ends of the DFF 161a to 161d.

The inverting circuit 161f inputs an inverted signal of an output signal of the DFF 161a to a data input end (D) of the DFF 161a, and also to the clock input end (CP) of the DFF 161b. The inverting circuit 161g inputs an inverted signal of an output signal of the DFF 161b to a data input end (D) of the DFF 161b, and also to the clock input end (CP) of the DFF 161c. The signal S12 is input to a data input end (D) of the DFF 161c. An output signal of the DFF 161c is input to a data input end (D) of the DFF 161d. An output signal of the DFF 161d is input to the clock input end (CP) of the DFF 161e. The signal POR is input to a data input end (D) and a reset input end of the DFF 161e. An output signal of the DFF 161e is the signal S13.

Figure 13:
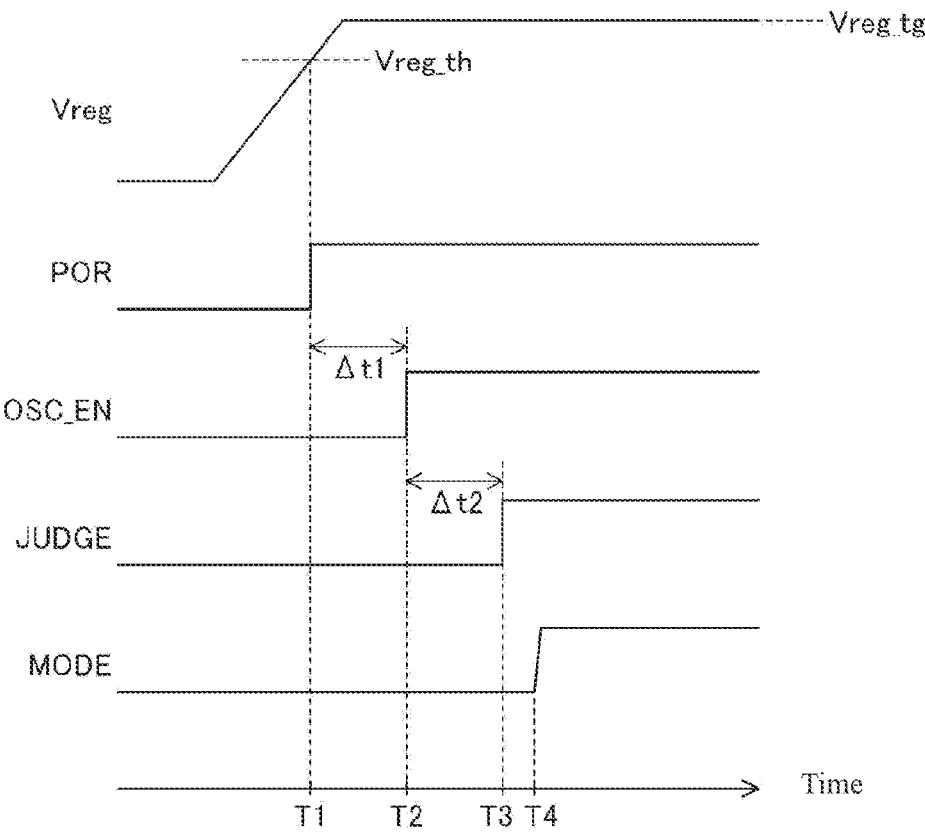
FIG. 13 is a timing diagram when a first power supply control device of the first embodiment of the embodiments of the present disclosure is started.

Details of the mode determination process are described with reference to FIG. 13. FIG. 13 shows a timing diagram when the device 10 is started. FIG. 13 depicts waveforms of the internal power supply voltage Vreg, and the signals POR, OSC_EN, JUDGE and MODE. The signal POR is a power supply reset signal. The signal OSC_EN is an enable signal for the oscillation circuit 25a. The signal JUDGE is a determination indication signal for indication of an execution of the mode determination process.

When a supply of the input voltage Vin to the device 10 starts, the internal power supply circuit 80 is activated, and the internal power supply voltage Vreg increases from 0 V to a predetermined voltage Vreg_tg. When the internal power supply voltage Vreg reaches a predetermined threshold voltage Vreg_th (<Vreg_tg) at an instant T1 during a rising process of the internal power supply voltage Vreg, the power supply reset circuit (not shown) disposed in the device 10 causes the signal POR to generate a rising edge. At the instant T1, all of the signals OSC_EN, JUDGE and MODE are at an initial level, that is, at a low level. The initial setting process begins from the instant T1 (see FIG. 5).

A startup circuit (not shown) disposed in the device 10 causes the signal OSC_EN to generate a rising edge at an instant T2 at which a predetermined time Δt1 has elapsed from the instant T1, further causing the signal JUDGE to generate a rising edge at an instant T3 at which a predetermined time Δt2 has elapsed from the instant T2. The oscillation circuit 25a performs oscillation only in a high level period of the signal OSC_EN, and generates and outputs the reference clock signal CLKa. During a low level period of the signal OSC_EN, the input signal to the inverting circuit 141 is fixed at a low level.

An instant T4 arrives after the instant T3. Up to the instant T4, the mode setting signal MODE is at the initial level, that is, at a low level. The mode setting signal MODE at a high level is the first mode setting signal MODE having a first value. The mode setting signal MODE at a low level is the second mode setting signal MODE having a second value. Between the instants T3 and T4, the mode determination process is performed (see FIG. 5). In the device 10[1], with the mode determination process, at the instant T4, the level of the mode setting signal MODE switches from a low level to a high level. In the device 10[2], with the mode determination process, even after the instant T4, the level of the mode setting signal MODE is still maintained at a low level and does not change to a high level.

Referring to FIG. 14 to FIG. 18, operation details of the synchronization management circuit 130 in the device 10[1] are described below. Moreover, in FIG. 14 to FIG. 18, "(L)" indicates that a corresponding signal has a low level, and "(H)" indicates a corresponding signal has a high level (the same applies to FIG. 19 and FIG. 20 below). The synchronization management circuit 130 of the device 10[1] is specifically referred to as a synchronization management circuit 130 [1].

Figure 14:
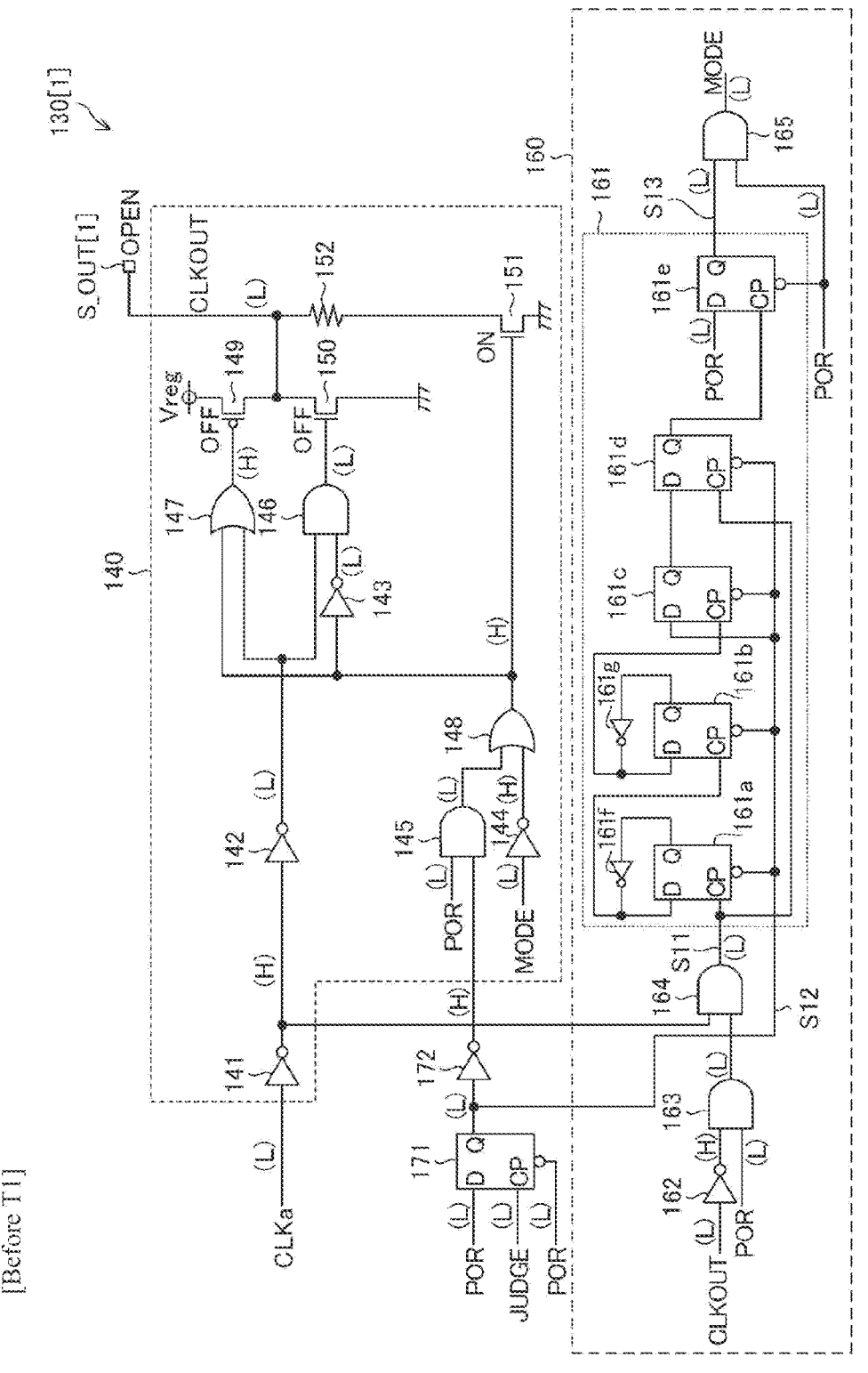
FIG. 14 is a diagram of states of signals when a first power supply control device of the first embodiment of the embodiments of the present disclosure is started.

FIG. 14 shows a state of the synchronization management circuit 130 [1] before the instant T1. In the synchronization management circuit 130 [1], during a low level period of the signal POR, the mode setting signal MODE has a low level and thus the output signal of the OR circuit 148 has a high level, such that the transistors 149 and 150 are turned off and the transistor 151 is turned on. In the device 10[1], the synchronous output terminal S_OUT[1] is substantially in an open state. Thus, when the transistors 149 and 150 are turned off and the transistor 151 is turned on in the device 10[1], the synchronous output terminal S_OUT[1] is pulled down by the transistor 151 to ground (that is, pulled down to a low level) via the resistor 152 and so the signal CLKOUT has a low level. Moreover, before the instant T1, the signals S11 to S13 are maintained at a low level.

Figure 15:
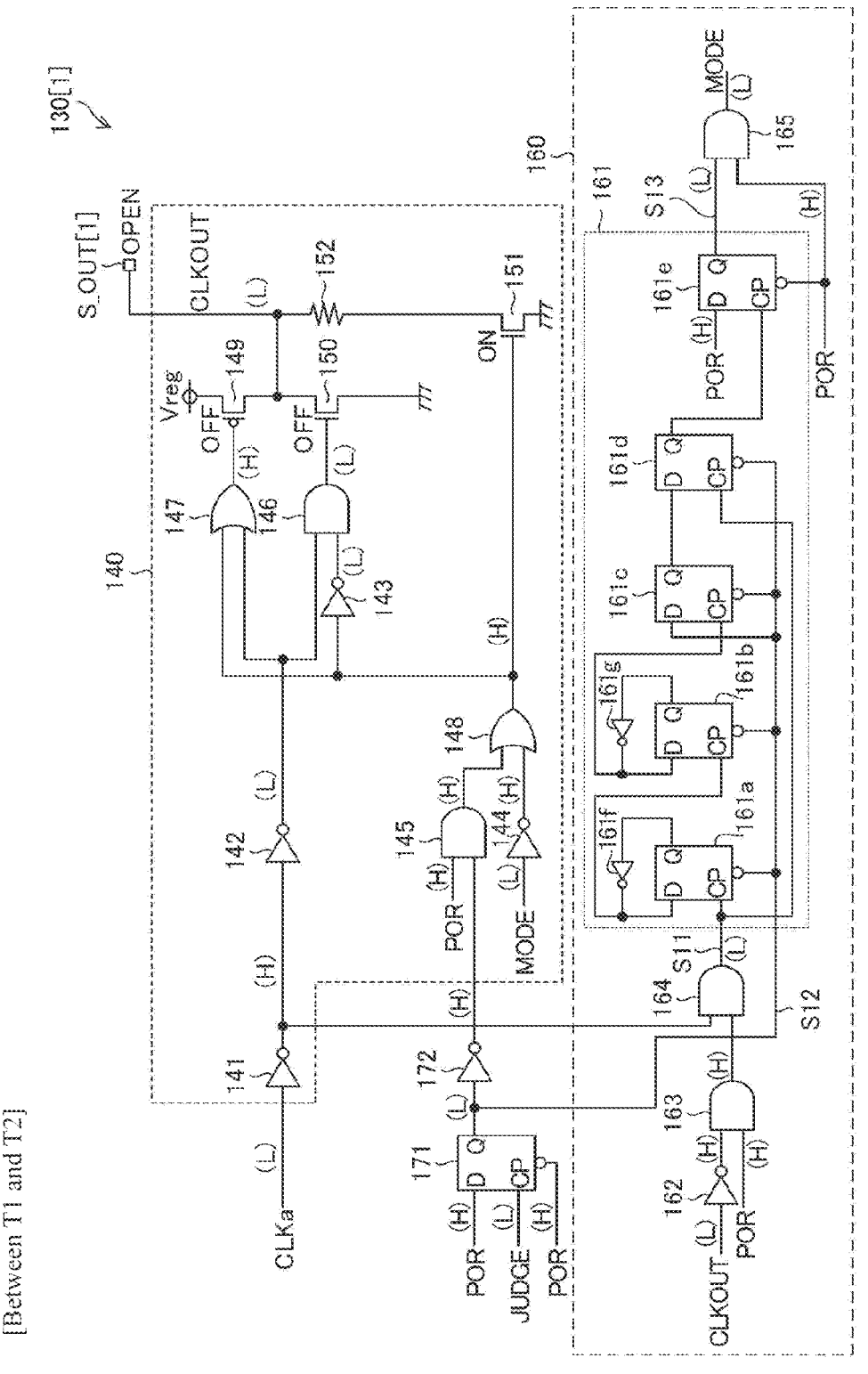
FIG. 15 is a diagram of states of signals when a first power supply control device of the first embodiment of the embodiments of the present disclosure is started.

FIG. 15 shows a state of the synchronization management circuit 130 [1] from the instant T1 up to the instant T2. Since a rising edge is generated in the signal POR at the instant T1, levels of several signals other than the signal POR in the synchronization management circuit 130 [1] are also changed. Before the instant T2, the signals S11 and S12 have been persistently fixed at a low level previously, and so the signal S13 has a low level and the mode setting signal MODE thus has a low level. When the mode setting signal MODE is at a low level, the transistors 149 and 150 are turned off and the transistor 151 is turned on based on the output signal at a high level from the OR circuit 148, and the signal CLKOUT has a low level.

Figure 16:
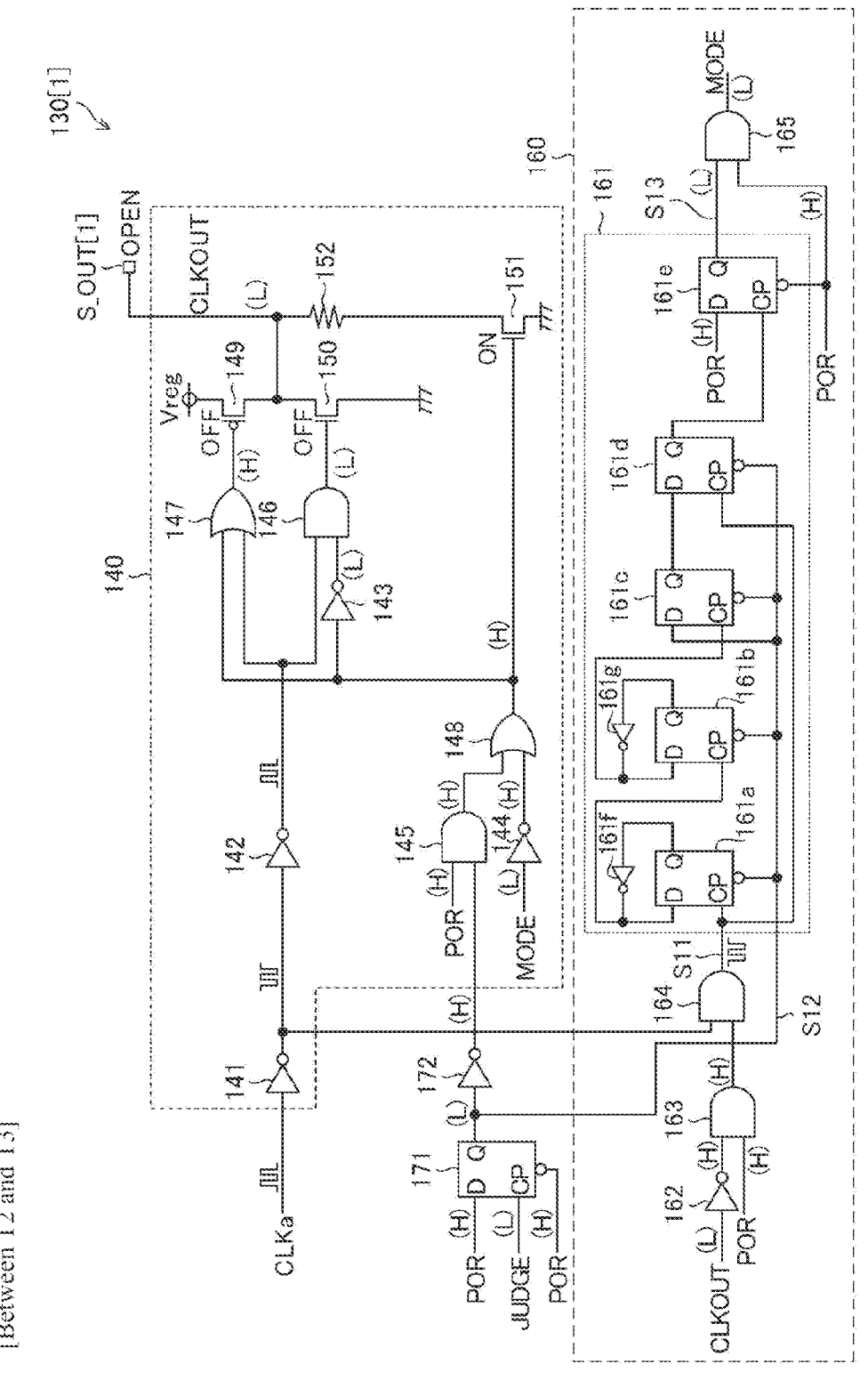
FIG. 16 is a diagram of states of signals when a first power supply control device of the first embodiment of the embodiments of the present disclosure is started.

FIG. 16 shows a state of the synchronization management circuit 130 [1] from the instant T2 up to the instant T3. During a period from the instant T2 up to the instant T3, the respective input signals and output signals of the inverting circuits 141 and 142 as well as the signal S11 change alternately between a high level and a low level, and the occurrence of such changes during the period from the instant T2 up to the instant T3 is different from that during the period from the instant T1 up to the instant T2. Since the DFFs 161a to 161d before the instant T3 are in a reset state, the counter in the synchronous circuit 161 is not driven and so the signal S13 has a low level. The mode setting signal MODE is also at a low level when the signal S13 is at a low level. As described above, when the mode setting signal MODE is at a low level, the transistors 149 and 150 are turned off and the transistor 151 is turned on based on the output signal at a high level from the OR circuit 148, and the signal CLKOUT has a low level.

Figure 17:
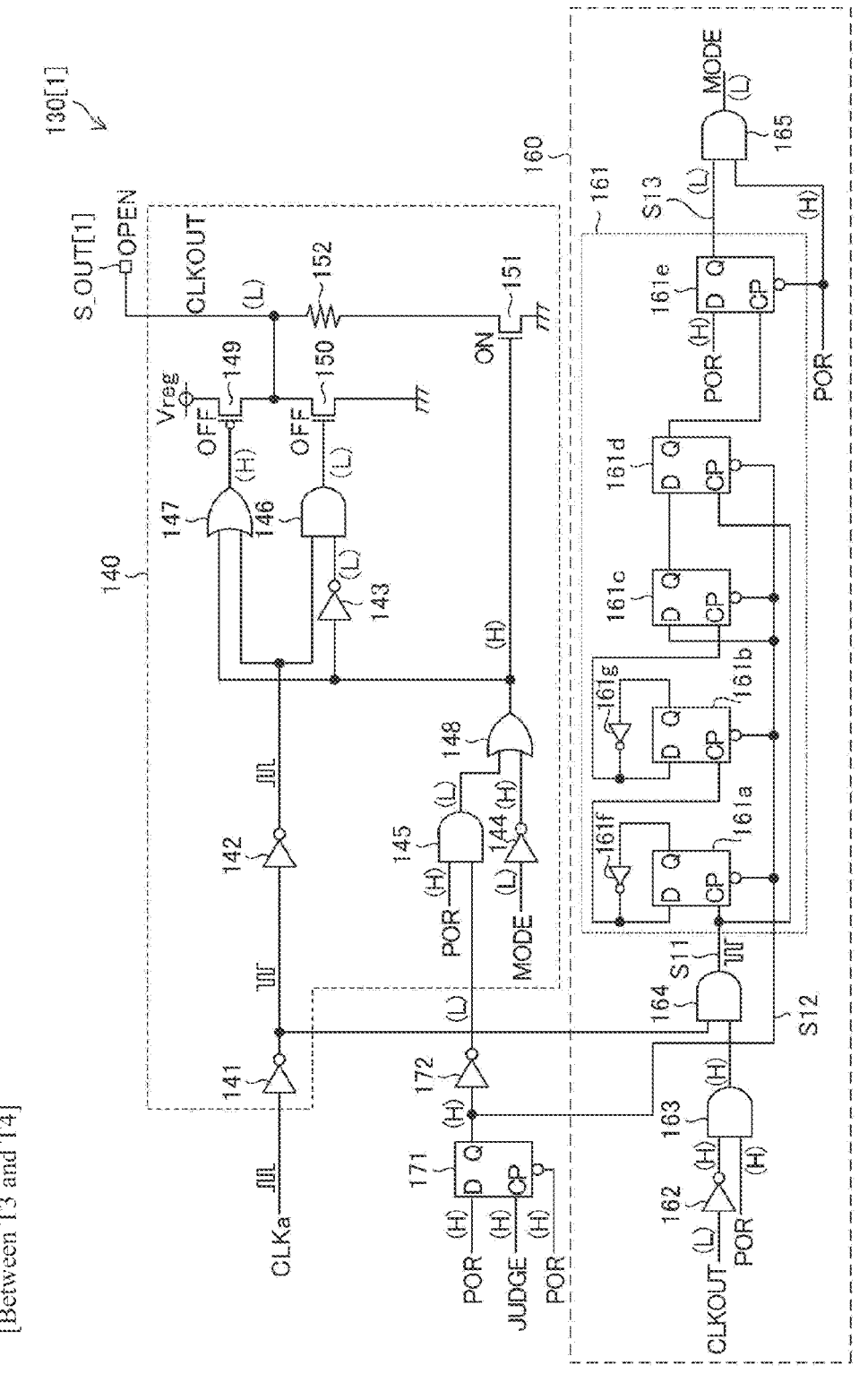
FIG. 17 is a diagram of states of signals when a first power supply control device of the first embodiment of the embodiments of the present disclosure is started.

FIG. 17 shows a state of the synchronization management circuit 130 [1] from the instant T3 up to the instant T4. In the synchronization management circuit 130 [1], a rising edge is generated in the output signal of the DFF 171 when the signal JUDGE switches to a high level at the instant T3, and thus a falling edge is generated in each of the output signals of the inverting circuit 172 and the AND circuit 145. However, up to the instant T4, the mode setting signal MODE has a low level.

On the other hand, since the rising edge in the output signal of the DFF 171 is equivalent to a rising edge in the signal S12, the reset state of the DFFs 161a to 161d are released at the instant T3. As such, in the synchronization management circuit 130 [1], an inverted signal of the reference clock signal CLKa is used as the clock signal S11 and is input to the synchronous circuit 161 after the instant T3. Thus, in the synchronization management circuit 130 [1], with the operation of the counter, a rising edge is generated in the input signal to the clock input end of the DFF 161e at the instant T4, and as a result, a rising edge is generated in the signal S13 and accordingly a rising edge is generated in the mode setting signal MODE.

Figure 18:
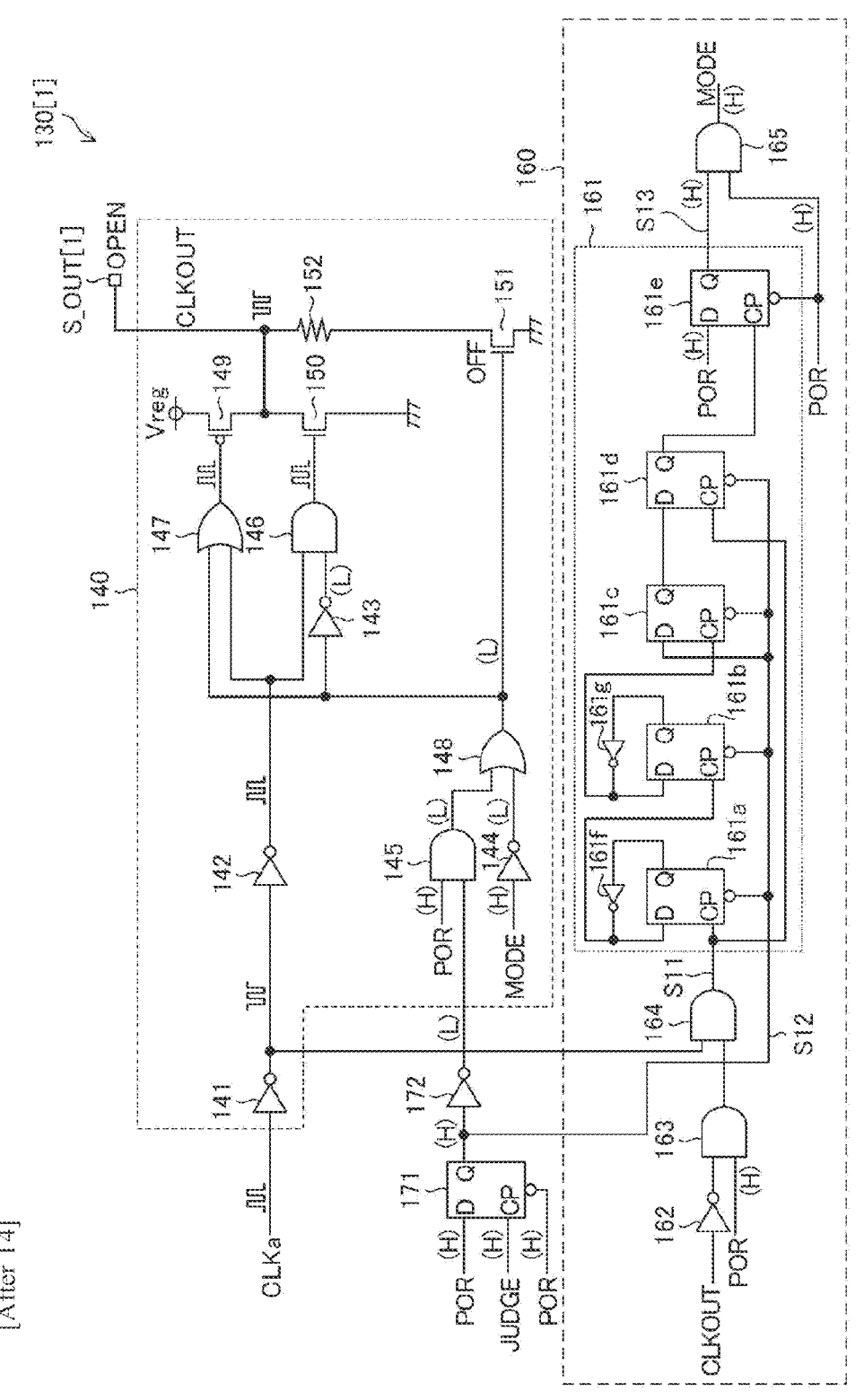
FIG. 18 is a diagram of states of signals when a first power supply control device of the first embodiment of the embodiments of the present disclosure is started.

FIG. 18 shows a state of the synchronization management circuit 130 [1] after the instant T4. In the synchronization management circuit 130 [1], after the instant T4, the mode setting signal MODE is maintained at a high level based on the signals S13 and POR at a high level. Moreover, the output signal of the AND circuit 145 has a low level after the instant T4 by using a rising edge of the signal JUDGE generated at the instant T3 as an opportunity. Thus, in the synchronization management circuit 130 [1], the output signal of the OR circuit 148 has a low level after the instant T4. The transistor 151 is turned off when the output signal of the OR circuit 148 has a low level, and the clock signal equivalent to the reference clock signal CLKa is supplied to the gates of the transistors 149 and 150 through the OR circuit 147 and the AND circuit 146. Thus, the transistors 149 and 150 are alternately turned on and turned off in synchronization with the reference clock signal CLKa. As such, in the synchronization management circuit 130 [1], the inverted signal of the reference clock signal CLKa as the signal CLKOUT appears after the instant T4. The signal CLKOUT equivalent to the inverted signal of the reference clock signal CLKa is output from the synchronous output terminal S_OUT[1], and is supplied to the synchronous input terminal S_IN[2].

Figure 19:
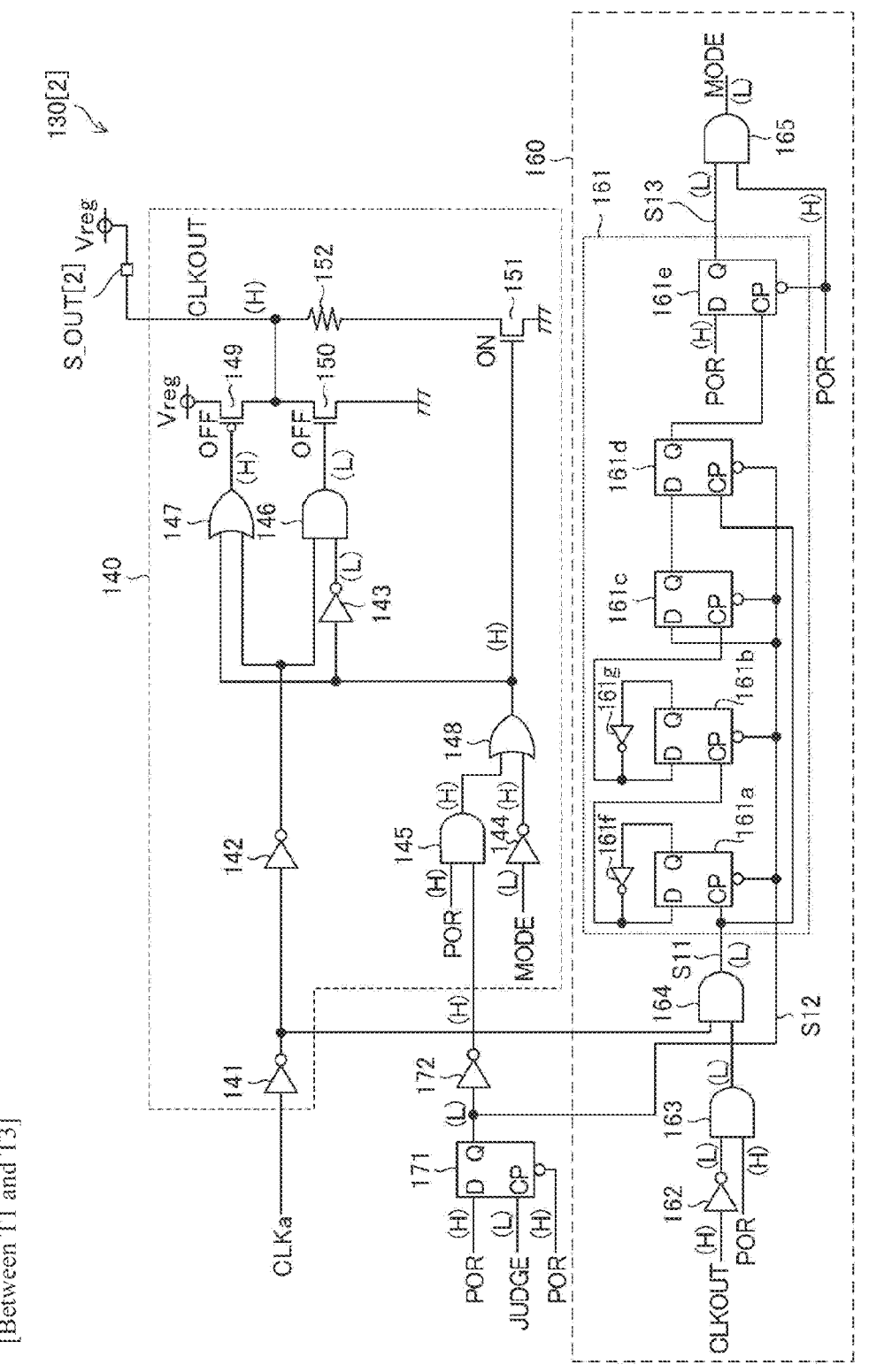
FIG. 19 is a diagram of states of signals when a second power supply control device of the first embodiment of the embodiments of the present disclosure is started.
Figure 20:
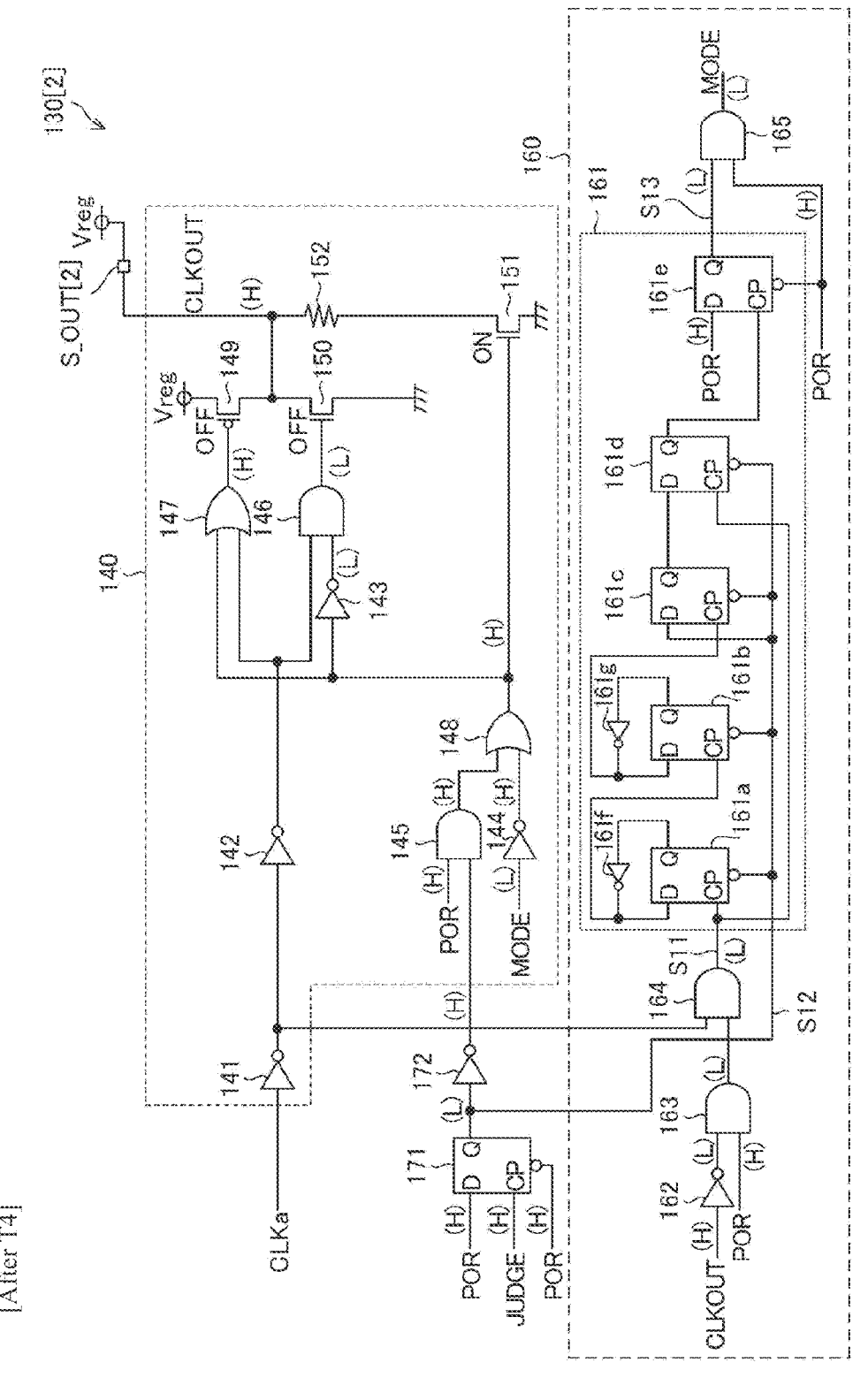
FIG. 20 is a diagram of states of signals when a second power supply control device of the first embodiment of the embodiments of the present disclosure is started.

Referring to FIG. 19 and FIG. 20, operation details of the synchronization management circuit 130 in the device 10[2] are described below. The synchronization management circuit 130 of the device 10[2] is specifically referred to as a synchronization management circuit 130 [2].

FIG. 19 shows a state of the synchronization management circuit 130 [2] from the instant T1 up to the instant T3. Up to the instant T3, similar to the description provided for the synchronization management circuit 130 [1], the mode setting signal MODE in the synchronization management circuit 130 [2] also has a low level. Thus, in the synchronization management circuit 130 [2], up to the instant T3, the transistors 149 and 150 are turned off and the transistor 151 is turned on based on the mode setting signal MODE at a low level. However, the synchronous output terminal S_OUT[2] of the device 10[2] is persistently supplied with the internal power supply voltage Vreg. Thus, in the synchronization management circuit 130 [2], the signal CLKOUT has a high level even if the transistor 151 is turned on. When the signal CLKOUT has a high level, the signal S11 is maintained at a low level by means of functions of the circuits 162 to 164.

In the synchronization management circuit 130 [2], a rising edge is generated in the signal JUDGE at the instant T3. However, after the instant T3, the signal CLKOUT is still fixed at a high level, and thus the signal S11 to the synchronous circuit 161 is maintained at a low level, and the counter is not driven. Therefore, in the synchronization management circuit 130 [2], the signal S13 is persistently at a low level and is unchanged after the instant T1, and as a result, the mode setting signal MODE is also persistently at a low level and is unchanged. FIG. 20 shows a state of the synchronization management circuit 130 [2] after the instant T4.

A period after the instant T4 is the normal operation period (see FIG. 5), and a normal operation is performed in each of the devices 10[1] and 10[2] after the instant T4. The normal operation includes switching control performed by the switching control circuit 20 on the output section MM. At least before the instant T4, the transistors MH and ML are kept as being turned off in each device 10.

In the device 10[1], in the normal operation period, the switching control circuit 20 generates the signal SET from the reference clock signal CLKa based on the mode setting signal MODE at a high level (the first mode setting signal MODE), and controls switching of the output section MM in synchronization with the signal SET generated (that is, in synchronization with the reference clock signal CLKa). Moreover, in the normal operation period, the mode setting signal MODE at a high level is received, and the signal output circuit 140 in the device 10[1] outputs the signal CLKOUT from the synchronous output terminal S_OUT[1], as the clock signal CLKb. The clock signal CLKb is input to the synchronous input terminal S_IN[2].

In the device 10[2], in the normal operation period, the switching control circuit 20 generates the signal SET from the input clock signal CLKb based on the mode setting signal MODE at a low level (the second mode setting signal MODE), and controls switching of the output section MM in synchronization with the signal SET generated (that is, in synchronization with the input clock signal CLKb).

As such, during an execution period of the mode determination process (from the instant T3 up to the instant T4), the signal output circuit 140 pulls down the synchronous output terminal S_OUT to a low level via the resistor 152. With the pull down, in a state in which the predetermined voltage (the internal power supply voltage Vreg herein) is not supplied to the synchronous output terminal S_OUT, the signal CLKOUT of the synchronous output terminal S_OUT has a low level in the execution period of the mode determination process. In a state in which the predetermined voltage is currently supplied to the synchronous output terminal S_OUT, the signal CLKOUT of the synchronous output terminal S_OUT has a high level. In the device 10[i], when the level of the signal CLKOUT is at a low level during the execution period of the mode determination process, the mode setting circuit 160 causes the mode setting signal MODE to generate a rising edge, so as to set the operation mode of the device 10[i] to the first mode; when the level of the signal CLKOUT is at a high level during the execution period of the mode determination process, the mode setting circuit 160 keeps the mode setting signal MODE at a low level, so as to set the operation mode of the device 10[i] to the second mode.

Moreover, as described above, the mode setting signal MODE at a high level has the first value and the mode setting signal MODE at a low level has the second value. When the signal of the synchronous output terminal S_OUT has a low level during the execution period of the mode determination process, the mode setting circuit 160 drives the synchronous circuit 161 using the reference clock signal CLKa, accordingly setting the mode setting signal MODE to the first value. When the signal of the synchronous output terminal S_OUT has a high level during the execution period of the mode determination process, the mode setting circuit 160 still keeps the value of the mode setting signal MODE to the initial value, that is, the second value. Moreover, the relationship between the first value and the second value with respect to a high level and a low level can also be opposite to that described above.

A switching power device, as a reference configuration, is discussed below. In the switching power device related to the reference configuration, an external terminal dedicated for mode setting is disposed in each power supply control device, and the operation mode of each power supply control device is set based on a voltage input to the external terminal dedicated for mode setting. In the switching power device related to the reference configuration, the power supply control device is correspondingly increased in size since the dedicated external terminal is needed. The increase in size of the power supply control device further leads to an increase in costs. The switching power device 1 according to this embodiment is capable of setting the operation mode of each device 10 without involving any dedicated external terminal, and is thus able to achieve miniaturization and cost reduction of the device 10.

Second Embodiment

The second embodiment is described below. The second to sixth embodiments below are embodiments based on the first embodiment. With respect to items not specifically described in the second to sixth embodiments, the details of the first embodiment are applicable to the second to sixth embodiments, given that no contradictions are incurred. For interpretation of the description associated with the second embodiments, the details associated with the second embodiment overrule in case of contradictions between the first and second embodiments (the same applies to the third to sixth embodiments below). Given that no contradictions are incurred, multiple embodiments among the first to sixth embodiments can be combined as desired.

The configuration of the signal output circuit 40 in the device 10[i] can be any as desired, given that the configuration used pulls down the synchronous output terminal S_OUT[i] to a low level (for example, grounded) via a resistor during the execution period of the mode determination process. The configuration of the mode setting circuit 60 in the device 10[i] can be any as desired, given that the configuration used sets the operation mode of the device 10[i] to the first mode or the second mode based on a level of the signal of the synchronous output terminal S_OUT[i] during the execution period of the mode determination process.

Figure 21:
FIG. 21 is a circuit diagram of a synchronization management circuit according to a second embodiment of the embodiments of the present disclosure.

FIG. 21 shows another configuration example of the mode setting circuit 60. FIG. 21 shows a circuit diagram of a synchronization management circuit 230 according to the second embodiment. The synchronization management circuit 230 includes a signal output circuit 140 and a mode setting circuit 260, and further includes a DFF 171 and an inverting circuit 172. In the second embodiment, the synchronization management circuit 230, the signal output circuit 140, the mode setting circuit 260 are used as the synchronization management circuit 30, the signal output circuit 40 and the mode setting circuit 60 in each device 10, respectively (refer to FIG. 4).

Taking the synchronization management circuit 130 in FIG. 11 as a reference, the mode setting circuit 160 is replaced by the mode setting circuit 260, and accordingly the synchronization management circuit 230 in FIG. 21 is obtained. Apart from the replacement above and the items below, the configuration and operation details of the synchronization management circuit 230 in FIG. 21 are the same as those of the synchronization management circuit 130 in FIG. 11.

The mode setting circuit 260 includes a comparator 261, an inverting circuit 262 and a DFF 263. The DFF 263 has a configuration same as that of the DFF 170 in FIG. 12.

The comparator 261 includes a non-inverting input terminal, an inverting input terminal and an output terminal. A signal CLKOUT and a voltage Vjudge are input to the non-inverting input terminal and the inverting input terminal of the comparator 261, respectively. The voltage Vjudge is a judging reference voltage having a predetermined positive DC voltage value. The signal CLKOUT is a signal in the synchronous output terminal S_OUT, as described above. The comparator 261 outputs a signal at a high level from its output terminal when the voltage of the signal CLKOUT is greater than the voltage Vjudge, and outputs a signal at a low level from its output terminal when the voltage of the signal CLKOUT is less than the voltage Vjudge. A value of the voltage Vjudge is set to have the comparator 261 output a signal at a high level when the signal CLKOUT has a high level, and to have the comparator 261 to output a signal at a low level when the signal CLKOUT has a low level. "Vth_L<Vjudge<Vth_H" can be established. Moreover, the comparator 261 can be provided with a hysteresis characteristic.

The inverting circuit 262 outputs an inverted signal of an output signal of the comparator 261. The output signal of the inverting circuit 262 is input to a data input end (D) of the DFF 263. The signals JUDGE and POR are input to a clock input end (CP) and a reset input end of the DFF 263, respectively. A mode setting signal MODE is output from the data output end (Q) of the DFF 263.

In the second embodiment, the timing diagram when the device 10 is started is the same as the timing diagram in FIG. 13. However, comparing the second embodiment with the first embodiment, a time difference between the instants T3 and T4 is shorter. The time difference is equivalent to a transmission delay time from a rising edge of the signal JUDGE until the signal at the data input end (D) of DFF 263 is reflected in the signal at the data output end (Q) of DFF 263.

As described in the first embodiment, up to the instant T4, the mode setting signal MODE has an initial level, that is, a low level.

In the device 10[1], with the mode determination process, at the instant T4, the level of the mode setting signal MODE switches from a low level to a high level. The reason for the above is that, in the device 10[1], before a rising edge is about to be generated in the signal JUDGE and at an instant at which a rising edge is generated in the signal JUDGE, the signal CLKOUT has a low level; thus, the signal input to the data input end (D) of the DFF 263 has a high level.

In contrast, in the device 10[2], with the mode determination process, even after the instant T4, the level of the mode setting signal MODE is still maintained at a low level and does not change to a high level. The reason for the above is that, in the device 10[1], before a rising edge is about to be generated in the signal JUDGE and at an instant at which a rising edge is generated in the signal JUDGE, the signal CLKOUT has a high level; thus, the signal input to the data input end (D) of the DFF 263 has a low level.

Third Embodiment

The third embodiment is described below. A supply source of the predetermined voltage can be any as desired, given that the predetermined voltage is supplied from the exterior of the device 10[2] to the synchronous output terminal S_OUT[2]. Thus, for example, the predetermined voltage can also be supplied from a DC voltage source (not shown) disposed external to the device 10[2] to the synchronous output terminal S_OUT[2].

Fourth Embodiment

Figure 22:
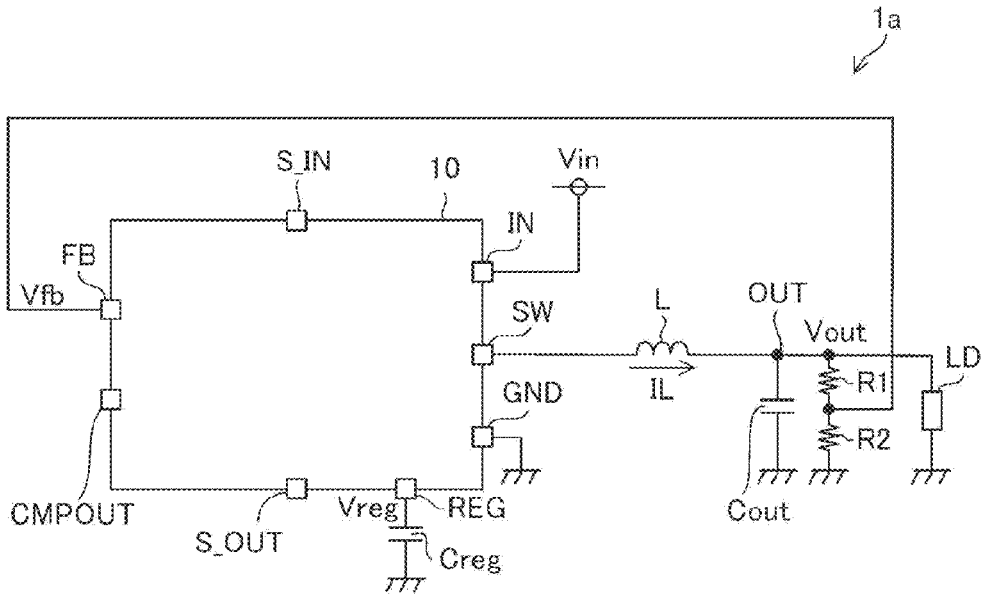
FIG. 22 is a configuration diagram of a variation of a switching power device according to a fourth embodiment of the present disclosure.

The fourth embodiment is described below. The switching power device can also be implemented by using one device 10. That is, a switching power device 1a shown in FIG. 22 can be formed. The switching power device 1 in FIG. 1 is provided with two groups of the device 10 and the coil L, wherein one of the groups can be omitted from the switching power device 1 to obtain the switching power device 1a. That is, the switching power device 1a can be obtained by omitting the device 10[2] and the coil L [2] from the switching power device 1 of FIG. 3. In the switching power device 1a, the synchronous output terminal S_OUT of the only one device 10 provided is open or is grounded. Accordingly, the operation mode of the device 10 in the switching power device 1a is set to the first mode.

Moreover, the switching power devices 1 and 1a in the description above are examples implemented by step-down DC/DC converters; however, the switching power devices 1 and 1a can also be implemented by step-up DC/DC converters or buck-boost DC/DC converters.

Fifth Embodiment

The fifth embodiment is described below. The switching power device 1 in FIG. 1 is an example of a semiconductor system including first and second semiconductor devices. The devices 10[1] and 10[2] are examples of the first and second semiconductor devices. Each of the first and second semiconductor devices includes functional circuits with predetermined functions. The functional circuits in the device 10 include the switching control circuit 20 and the output section MM used to convert the input voltage Vin into the output voltage Vout.

In the present disclosure, a semiconductor device is not limited to being a power supply control device installed in a switching power device. The technical concept of the present disclosure can be extensively applied to any semiconductor system in need of synchronization between first and second semiconductor devices. For example, each semiconductor device can be a driver device for driving a predetermined load (for example, a light emitting element, a display device or a motor), and at this point in time, the functional circuits of each semiconductor device are used to perform control on a predetermined load expected to be driven.

Sixth Embodiment

The sixth embodiment is described below.

For an arbitrary signal or voltage, the relationship between a high level and a low level thereof can be opposite to the relationship described above, provided that the form of the subject is not compromised.

The types of the channels of the field-effect transistors (FETs) shown in the embodiments are merely examples. Without compromising the form of the subject, the channel type of any FET can be varied between P-type channels and N-type channels.

Given that no inappropriateness is incurred, an arbitrary transistor can also be any type of transistor. For example, given that no anomalies are incurred, an arbitrary transistor implemented by a MOSFET in the description above can be replaced by a junction FET, an insulated gate bipolar transistor (IGBT) or a bipolar transistor. Any transistor includes a first electrode, a second electrode and a control electrode. In an FET, one of the first and second electrodes is the drain and the other is the source, and the control electrode is the gate. In an IGBT, one of the first and second electrodes is the collector and the other is the emitter, and the control electrode is the gate. For a bipolar transistor that is not an IGBT, one of the first and second electrodes is the collector and the other is the emitter, and the control electrode is the base.

Various modifications may be made to the embodiments of the disclosure within the scope of the technical concept of the claims. The embodiments above are only examples of possible implementations of the present disclosure, and the meanings of the terms of the present disclosure or the constituents are not limited to the meanings of the terms recited in the embodiments above. The specific numerical values recited in the description are simple examples, and these numerical values may be modified to various other numerical values.

NOTE

A note is attached to show specific configuration examples of the embodiments of the present disclosure above.

A semiconductor device (10) according to an embodiment of the present disclosure is configured as (a first configuration), that is, including:

a synchronous input terminal (S_IN);

a synchronous output terminal (S_OUT);

a functional circuit (20), having a reference clock signal generating circuit (25a) operable to generate a reference clock signal (CLKa);

a signal output circuit (40), connected to the synchronous output terminal; and a mode setting circuit (60), after a mode determination process, operable to set an operation mode of the functional circuit and the signal output circuit to a first mode or a second mode according to a result of the mode determination process, wherein the functional circuit is operable to perform a predetermined functional operation in synchronization with the reference clock signal in the first mode, and perform the functional operation in synchronization with an input clock signal (CLKb) transmitted to the synchronous input terminal from another semiconductor device in the second mode, the signal output circuit is operable to output a clock signal based on the reference clock signal from the synchronous output terminal in the first mode, and the mode setting circuit is operable to determine whether a specific voltage (for example, Vreg) satisfying a predetermined condition is supplied to the synchronous output terminal from an exterior of the semiconductor device in the mode determination process.

According to the semiconductor device above, the mode can be set by using the synchronous input terminal and the synchronous output terminal originally available for transmitting the clock signal. That is, a terminal exclusively for setting the mode can be eliminated, and this helps miniaturization and cost reduction of the semiconductor device.

The semiconductor device of the first configuration can further be configured as (a second configuration), wherein in the mode determination process, the mode setting circuit is operable to set the operation mode to the second mode when a supply state of the specific voltage to the synchronous output terminal is determined, and set the operation mode to the first mode when an non-supply state of the specific voltage to the synchronous output terminal is determined.

The semiconductor device of the second configuration (referring to FIG. 11 or FIG. 21) can further be configured as (a third configuration), wherein the signal output circuit is operable to pull down the synchronous output terminal to a first level (a low level) via a resistor (152) during an execution period of the mode determination process, when the specific voltage is not supplied due to the pull down, a signal of the synchronous output terminal is operable to have the first level during the execution period of the mode determination process, in the supply state of the specific voltage, the signal of the synchronous output terminal is operable to have a second level (a high level) greater than the first level, and the mode setting circuit is operable to set the operation mode to the first mode or the second mode based on a level of the signal of the synchronous output terminal during the execution period of the mode determination process.

The semiconductor device of the third configuration (referring to FIG. 11) can further be configured as (a fourth configuration), wherein the mode setting circuit (160) is operable to generate a mode setting signal (MODE) according to the result of the mode determination process, the mode setting signal has a first value or a second value, after the mode determination process, the operation mode is the first mode when the mode setting signal has the first value, and the operation mode is the second mode when the mode setting signal has the second value, the mode setting circuit includes a synchronous circuit (161), when the signal of the synchronous output terminal has the first level during the execution period of the mode determination process, the first value is set to be the mode setting signal by driving the synchronous circuit using the reference clock signal, and when the signal of the synchronous output terminal has the second level during the execution period of the mode determination process, the mode setting signal is maintained at the second value, which is an initial value.

The semiconductor device of the third configuration (referring to FIG. 21) can further be configured as (a fifth configuration), wherein the mode setting circuit (260) is operable to generate a mode setting signal (MODE) according to the result of the mode determination process, the mode setting signal has a first value or a second value, after the mode determination process, the operation mode is the first mode when the mode setting signal has the first value, and the operation mode is the second mode when the mode setting signal has the second value, in the mode determination process, the mode setting circuit is operable to use a comparator (261) to compare a voltage of the signal of the synchronous output terminal with a predetermined judging reference voltage (Vjudge), set the mode setting signal to the first value when the voltage of the signal at the synchronous output terminal is less than the judging reference voltage, and set the mode setting signal to the second value when the voltage of the signal of the synchronous output terminal is greater than the judging reference voltage.

The semiconductor device of any one of the first to fifth configurations can further be configured as (a sixth configuration), wherein the semiconductor device is a power supply control device (10) disposed in a switching power device operable to generate an output voltage (Vout) from an input voltage (Vin), the functional circuit includes:

an output section (MM), disposed between an application end of the input voltage and an application end of the output voltage;

a switching control circuit (20), operable to electrically convert the input voltage into the output voltage by controlling switching of the output section, in the first mode, the switching control is synchronized with the reference clock signal, and in the second mode, the switching control is synchronized with the input clock signal.

A semiconductor system according to an embodiment of the present disclosure is configured as (a seventh configuration) a semiconductor system including:

a first semiconductor device (10[1]) and a second semiconductor device (10[2]), wherein each of the first and second semiconductor devices is the semiconductor device of any one of the first to fifth configurations, the synchronous output terminal (S_OUT[1]) of the first semiconductor device is connected to the synchronous input terminal (S_IN[2]) of the second semiconductor device, the specific voltage (Vreg) is supplied to the synchronous output terminal of the second semiconductor device through wiring (Wr) disposed external to the second semiconductor device, in the first semiconductor device, the mode setting circuit is operable to set the operation mode to the first mode, and in the second semiconductor device, the mode setting circuit is operable to set the operation mode to the second mode.

A switching power device according to an embodiment of the preset disclosure is configured as (an eighth configuration), a switching power device (1) operable to generate an output voltage (Vout) from an input voltage (Vin), including:

a first power supply control device (10[1]) and a second power supply control device (10[2]), wherein each of the first and second power supply control devices is the semiconductor device of the sixth configuration, the synchronous output terminal (S_OUT[1]) of the first power supply control device is connected to the synchronous input terminal (S_IN[2]) of the second power supply control device, the specific voltage (Vreg) is supplied to the synchronous output terminal of the second power supply control device through wiring (Wr) disposed external to the second power supply control device, in the first power supply control device, the mode setting circuit is operable to set the operation mode to the first mode, in the second power supply control device, the mode setting circuit is operable to set the operation mode to the second mode, and a current is supplied from the application end (IN) of the input voltage to the application end (OUT) of the output voltage through the output section of the first power supply control device and the output section of the second power supply control device.

The invention claimed is:

1. A semiconductor device, comprising:

a synchronous input terminal;

a synchronous output terminal;

a functional circuit, having a reference clock signal generating circuit operable to generate a reference clock signal;

a signal output circuit, connected to the synchronous output terminal; and a mode setting circuit, after a mode determination process, operable to set an operation mode of the functional circuit and the signal output circuit to a first mode or a second mode based on a result of the mode determination process, wherein the functional circuit is operable to perform a predetermined functional operation in synchronization with the reference clock signal in the first mode, and perform the functional operation in synchronization with an input clock signal transmitted to the synchronous input terminal from another semiconductor device in the second mode, the signal output circuit is operable to output a clock signal based on the reference clock signal from the synchronous output terminal in the first mode, and the mode setting circuit is operable to determine whether a specific voltage satisfying a predetermined condition is supplied to the synchronous output terminal from an exterior of the semiconductor device in the mode determination process.

2. The semiconductor device of claim 1, wherein in the mode determination process, the mode setting circuit is operable to set the operation mode to the second mode when a supply state of the specific voltage to the synchronous output terminal is determined, and set the operation mode to the first mode when an non-supply state of the specific voltage to the synchronous output terminal is determined.

3. The semiconductor device of claim 2, wherein the signal output circuit is operable to pull down the synchronous output terminal to a first level via a resistor during an execution period of the mode determination process, when the specific voltage is not supplied due to the pull down, a signal of the synchronous output terminal is operable to have the first level during the execution period of the mode determination process, in the supply state of the specific voltage, the signal of the synchronous output terminal is operable to have a second level greater than the first level, and the mode setting circuit is operable to set the operation mode to the first mode or the second mode according to a level of the signal of the synchronous output terminal during the execution period of the mode determination process.

4. The semiconductor device of claim 3, wherein the mode setting circuit is operable to generate a mode setting signal according to the result of the mode determination process, the mode setting signal has a first value or a second value, after the mode determination process, the operation mode is the first mode when the mode setting signal has the first value, and the operation mode is the second mode when the mode setting signal has the second value, the mode setting circuit includes a synchronous circuit, when the signal of the synchronous output terminal has the first level during the execution period of the mode determination process, the first value is set to be the mode setting signal by driving the synchronous circuit using the reference clock signal, and when the signal of the synchronous output terminal has the second level during the execution period of the mode determination process, the mode setting signal is maintained at the second value, which is an initial value.

5. The semiconductor device of claim 4, wherein the semiconductor device is a power supply control device disposed in a switching power device operable to generate an output voltage from an input voltage, the functional circuit includes:

an output section, disposed between an application end of the input voltage and an application end of the output voltage;

a switching control circuit, operable to electrically convert the input voltage into the output voltage by controlling switching of the output section, in the first mode, the switching control is synchronized with the reference clock signal, and in the second mode, the switching control is synchronized with the input clock signal.

6. The semiconductor device of claim 3, wherein the mode setting circuit is operable to generate a mode setting signal according to the result of the mode determination process, the mode setting signal has a first value or a second value, after the mode determination process, the operation mode is the first mode when the mode setting signal has the first value, and the operation mode is the second mode when the mode setting signal has the second value, in the mode determination process, the mode setting circuit is operable to use a comparator to compare a voltage of the signal of the synchronous output terminal with a predetermined judging reference voltage, set the mode setting signal to the first value when the voltage of the signal at the synchronous output terminal is less than the judging reference voltage, and set the mode setting signal to the second value when the voltage of the signal of the synchronization output terminal is greater than the judging reference voltage.

7. The semiconductor device of claim 6, wherein the semiconductor device is a power supply control device disposed in a switching power device operable to generate an output voltage from an input voltage, the functional circuit includes:

an output section, disposed between an application end of the input voltage and an application end of the output voltage;

a switching control circuit, operable to electrically convert the input voltage into the output voltage by controlling switching of the output section, in the first mode, the switching control is synchronized with the reference clock signal, and in the second mode, the switching control is synchronized with the input clock signal.

8. The semiconductor device of claim 3, wherein the semiconductor device is a power supply control device disposed in a switching power device operable to generate an output voltage from an input voltage, the functional circuit includes:

an output section, disposed between an application end of the input voltage and an application end of the output voltage;

a switching control circuit, operable to electrically convert the input voltage into the output voltage by controlling switching of the output section, in the first mode, the switching control is synchronized with the reference clock signal, and in the second mode, the switching control is synchronized with the input clock signal.

9. The semiconductor device of claim 2, wherein the semiconductor device is a power supply control device disposed in a switching power device operable to generate an output voltage from an input voltage, the functional circuit includes:

an output section, disposed between an application end of the input voltage and an application end of the output voltage;

a switching control circuit, operable to electrically convert the input voltage into the output voltage by controlling switching of the output section, in the first mode, the switching control is synchronized with the reference clock signal, and in the second mode, the switching control is synchronized with the input clock signal.

10. The semiconductor device of claim 1, wherein the semiconductor device is a power supply control device disposed in a switching power device operable to generate an output voltage from an input voltage, the functional circuit includes:

an output section, disposed between an application end of the input voltage and an application end of the output voltage;

a switching control circuit, operable to electrically convert the input voltage into the output voltage by controlling switching of the output section, in the first mode, the switching control is synchronized with the reference clock signal, and in the second mode, the switching control is synchronized with the input clock signal.

11. A switching power device, operable to generate an output voltage from an input voltage, comprising:

a first power supply control device and a second power supply control device, wherein each of the first and second power supply control devices is the semiconductor device of claim 10, the synchronous output terminal of the first power supply control device is connected to the synchronous input terminal of the second power supply control device, the specific voltage is supplied to the synchronous output terminal of the second power supply control device through wiring disposed external to the second power supply control device, in the first power supply control device, the mode setting circuit is operable to set the operation mode to the first mode, in the second power supply control device, the mode setting circuit is operable to set the operation mode to the second mode, and a current is supplied from the application end of the input voltage to the application end of the output voltage through the output section of the first power supply control device and the output section of the second power supply control device.

12. A semiconductor system, comprising:

a first semiconductor device and a second semiconductor device, wherein each of the first and second semiconductor devices is the semiconductor device of claim 1, the synchronous output terminal of the first semiconductor device is connected to the synchronous input terminal of the second semiconductor device, the specific voltage is supplied to the synchronous output terminal of the second semiconductor device through wiring disposed external to the second semiconductor device, in the first semiconductor device, the mode setting circuit is operable to set the operation mode to the first mode, and in the second semiconductor device, the mode setting circuit is operable to set the operation mode to the second mode.

* * * * *